US010511873B1

(12) United States Patent
Voytenko et al.

(10) Patent No.: US 10,511,873 B1
(45) Date of Patent: Dec. 17, 2019

(54) CORRECTING SYSTEMATIC TUNING DEFECTS

(71) Applicant: The Nielsen Company (US), LLC, New York, NY (US)

(72) Inventors: Denis Voytenko, Oldsmar, FL (US); Paul Chimenti, Tampa, FL (US); Joshua Zinzer, Chicago, IL (US); David J. Kurzynski, South Elgin, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/118,053

(22) Filed: Aug. 30, 2018

(51) Int. Cl.
*H04N 21/258* (2011.01)
*H04N 21/24* (2011.01)

(52) U.S. Cl.
CPC ... *H04N 21/25808* (2013.01); *H04N 21/2408* (2013.01)

(58) Field of Classification Search
CPC .............. H04N 21/25808; H04N 21/2408
See application file for complete search history.

(56) References Cited

U.S. PATENT DOCUMENTS

| 8,863,166 | B2 | 10/2014 | Harsh et al. | |
| 8,930,978 | B2 * | 1/2015 | Vinson | H04N 21/2407 705/14.43 |
| 2013/0014147 | A1 * | 1/2013 | Hadfield | H04N 21/43 725/14 |
| 2019/0158916 | A1 * | 5/2019 | Shankar | H04N 21/44222 |

* cited by examiner

*Primary Examiner* — Sumaiya A Chowdhury
(74) *Attorney, Agent, or Firm* — Hanley, Flight & Zimmerman, LLC

(57) ABSTRACT

Apparatus, systems, articles of manufacture, and methods are disclosed for correcting systematic tuning defects. An example apparatus includes a defect analyzer to identify a suspect time window in tuning volume data of return path data reported by set top boxes. The example apparatus further includes a return path data transformer to identify a first return path data entry indicating a first set top box reported a first transition to an off state at a first time during the suspect time window and to modify the first return path data entry to (1) eliminate the first transition to the off state at the first time and (2) assign the first return path data entry a first duration to remain in an on state after the first time, where the first duration is determined based on monitoring data reported from media device meters monitoring media presentation devices.

20 Claims, 10 Drawing Sheets

CORRECTING SYSTEMATIC TUNING DEFECTS

FIELD OF THE DISCLOSURE

This disclosure relates generally to media monitoring, and, more particularly, to methods, apparatus, systems, and articles of manufacture for correcting systematic tuning defects.

BACKGROUND

Set top boxes delivering content to media presentation devices (e.g., televisions) can provide return path data to media providers (e.g., cable providers, satellite providers, etc.), which includes tuning data describing when the respective set top boxes are powered on and off. Recently, audience measurement entities have begun collecting the return path data to determine tuning volume data (e.g., overall audience sizes, audience sizes for a specific program, audience sizes for a channel, etc.).

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
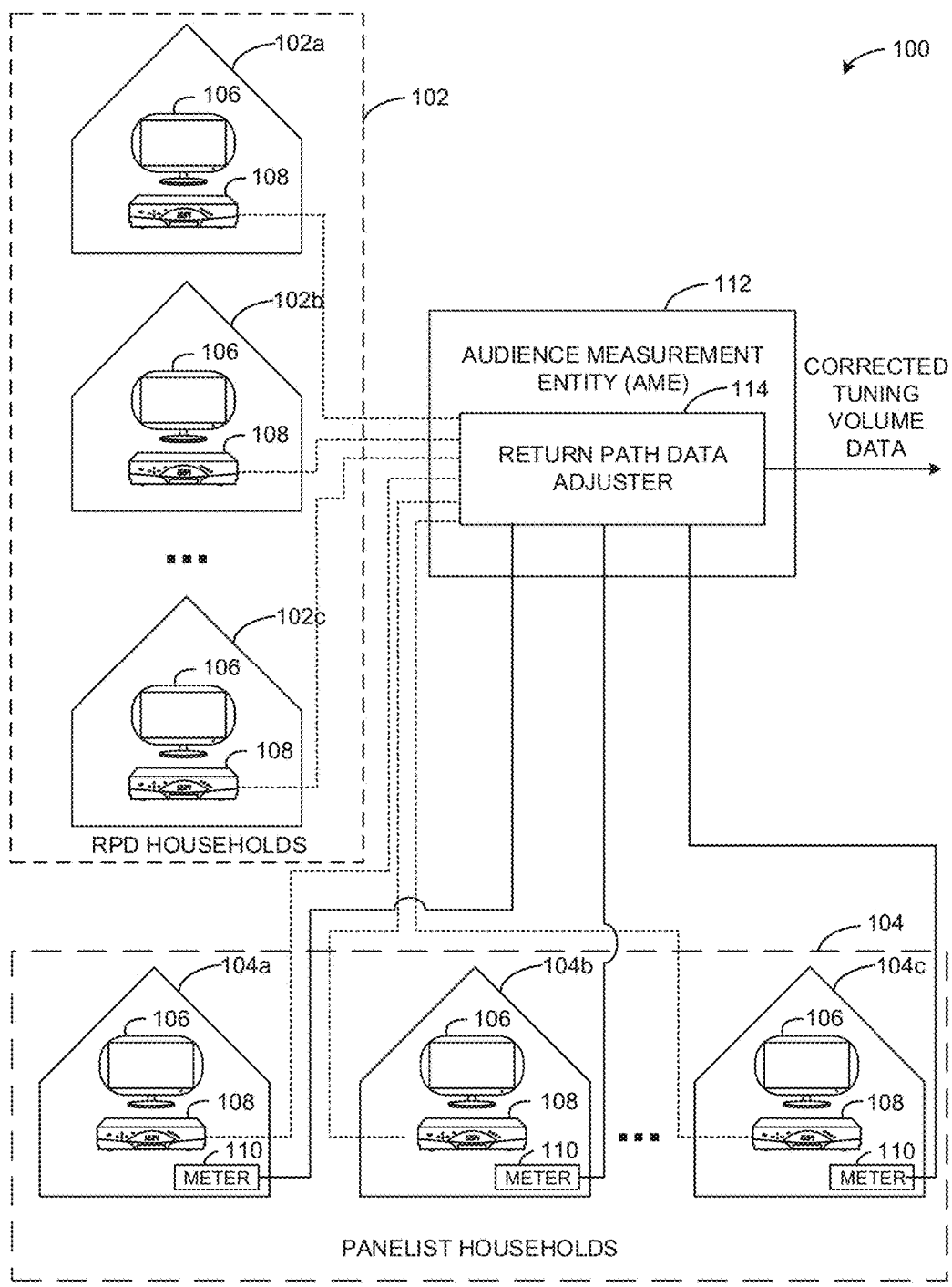
FIG. 1 is an example environment for correcting systematic tuning data defects constructed in accordance with the teachings of this disclosure.

Audience measurement entities (AMEs) desire knowledge on how users interact with media devices such as smartphones, tablets, laptops, smart televisions, etc. In particular, AMEs want to monitor media presentations made at the media devices to, among other things, monitor exposure to advertisements, determine advertisement effectiveness, determine user behavior, identify purchasing behavior associated with various demographics, etc. As used herein, the term "media" includes any type of content and/or advertisement delivered via any type of distribution medium. Thus, media includes television programming or advertisements, radio programming or advertisements, movies, web sites, streaming media, etc.

In some examples, AMEs utilize panelists to obtain media monitoring data. Panelists are registered on panels maintained by a ratings entity (e.g., an AME) that owns and/or operates the ratings entity subsystem. AMEs utilize data from metering devices to monitor exposure to media, determine advertising effectiveness, determine user behavior, etc. For example, a panelist can carry a portable metering device that collects data about the environment surrounding the panelist to determine media consumption (e.g., by recording audio via a microphone, transmitting monitoring data to the audience measurement entity, etc.). Additionally or alternatively, a panelist can have media monitoring devices in their household that communicate with media presentation devices (e.g., televisions, set top boxes, etc.) to collect media monitoring data. Other metering techniques utilize software to collect media monitoring data (e.g., software on a tablet, software on a Smart TV, software on a personal computer, etc.). All of these techniques typically require a panelist and/or the AME to perform an installation procedure to provide the panelist with hardware and/or software to perform monitoring.

Recently, AMEs have began using data that is already collected to monitor media without requiring enrollment of panelists and installation and/or carrying of additional hardware and/or software to perform monitoring. For example, many set top boxes (e.g., cable boxes, satellite tuning boxes, etc.), which provide media to media presentation devices (e.g., televisions), automatically collect and transmit data on media consumption habits. Such data can be included in return path data, which is data obtained via a return path from a set top box to a media provider (e.g., a cable television, a satellite television provider, etc.). AMEs can utilize return path data for media monitoring to obtain media monitoring data with larger sample sizes without requiring enrolled panelists with additional hardware and/or software requirements. By aggregating data from return path data from a plurality of set top boxes, AMEs can generate media monitoring data that has higher accuracy than using the generally smaller sample sizes associated with panelist data. AMEs can generate tuning volume data representing an overall volume of set top boxes that are in an on state (and therefore presenting media) at any time. As used herein, the term "tuning data" is used to refer to data pertaining to set top box tuning behavior (e.g., whether a set top box was in an "on" state or an "off" state). As used herein, the term "tuning volume data" refers to aggregate set top box tuning behavior (e.g., a count of set top boxes that are in an "on" state or in an "off" state). In some examples, the AME can calculate an overall number of set top boxes tuned to a specific channel for a time period (e.g., one hour of prime-time television, a day, etc.). In some examples, return path data is not linked to a specific consumer and does not include identifying information, thereby enabling simplified collection of media monitoring information on a large scale without requiring explicit enrollment of panelists.

However, in some examples, tuning volume data based on return path data can have defects due to irregularities experienced by the set top box. For example, a set top box can report incorrect tuning data in the return path data at a time associated with a transmission of the return path data to the media provider and/or to the AME. For example, a plurality of set top boxes may report restarting, or report turning off, according to the return path data at the end of a collection period, despite media still being presented and consumed. Conventionally, such defects in tuning volume data based on return path data would not be corrected, and may not even be identified.

As another example, if an area experiences a power outage, tuning volume data (e.g., representing quantities of set top boxes in an "on" state or an "off" state) can include sharp declines due to the set top boxes associated with the power outage turning off. While this tuning volume data may be accurate (e.g., the set top boxes did actually turn off, and did not present media during the power outage), an AME may desire that the tuning volume data not be reflective of such events that are unrelated to voluntary media consumption habits. For example, the AME may not want to provide data that reflects a sharp decline in viewership for a program based on set top boxes that turned off due to a power outage. Conventionally, such a defect may be identified by a sharp decline in viewership (e.g., tuning volume), but may remain uncorrected, as conventional media monitoring techniques do not address correcting tuning volume data.

Example methods, apparatus, systems, and articles of manufacture (e.g., physical storage media) disclosed herein enable correction of systematic tuning data defects. For example, techniques disclosed herein enable identification of systematic tuning data defects via a comparison of raw tuning volume data generated from return path data and monitored data (e.g., tuning volume data generated from panelist data). In some examples, when the raw tuning volume data indicates different behavior compared to tuning volume data generated from the monitored data for a time period, the time period can be flagged as a suspect time period, indicating a potential systematic tuning data defect. In some examples disclosed herein, after identifying a suspect time period, return path data from individual set top boxes can be analyzed to identify set top boxes and return path data entries that may have been associated with the systematic tuning data defect. For example, set top boxes which reported a transition from an on state to an off state within the suspect time window and did not report a second transition from the off state to the on state within a discrepancy time period (e.g., a time period associated with the amount of time for which the raw tuning volume data and the tuning volume data based on monitoring data remain different) may be identified. In other examples, techniques disclosed herein disclose identify set top boxes that (1) reported a first transition from an off state to an on state within the suspect time window, (2) reported a second transition from the on state to the off state within the suspect time window, and (3) did not report a third transition from the off state to the on state after the second transition and within the discrepancy time period.

Following identification of suspect time windows and identification of set top boxes that experienced behavior corresponding to a possible systematic tuning data defect, example techniques disclosed herein identify suspect return path data entries and modify the suspect return path data entries to correct possible defects. In some examples, a first transition from an on state to an off state is eliminated (e.g., causing the return path data to indicate the set top box remained "on" at the time of the first transition), and the set top box is assigned a new duration in the on state based on a statistical model. For example, a statistical model can be generated based on monitoring data (e.g., panelist data). In some examples, the statistical model is a uniform distribution and the return path entries are assigned a random "on" duration based on the uniform distribution with a maximum time value corresponding to the discrepancy time period (e.g., the time during which the return path data and the monitoring data exhibit different behavior). After modifying return path data associated with the respective set top boxes corresponding to the possible systematic tuning data defect, corrected tuning volume data can be generated. In some examples, the corrected tuning volume data is again compared to tuning volume data based on monitoring data to determine whether the modified return path data corresponds to the tuning volume behavior and/or pattern in the monitoring data (e.g., panelist data).

In example methods, apparatus, systems, and articles of manufacture (e.g., physical storage media) disclosed herein, return path data entries that are identified as corresponding to a possible systematic tuning data defect are modified to mollify the effect of the defect(s) in the tuning data based on the return path data to reflect patterns and/or behavior shown in the monitored data. The monitored data (e.g., panelist data) may be more granular, descriptive, and/or accurate, but may be reflective of a small sample size. Thus, techniques disclosed herein enable usage of return path data to generate accurate tuning volume data while ensuring that any systematic tuning data defects in the return path data are addressed via comparison to the monitored data.

FIG. 1 is an example environment 100 for correcting systematic tuning data defects constructed in accordance with the teachings of this disclosure. The example environment 100 includes example return path data (RPD) households 102, including an example first RPD household 102a, an example second RPD household 102b, and an example third RPD household 102c. The example environment 100 further includes the panelist households 104, including an example first panelist household 104a, an example second panelist household 104b, and an example third panelist household 104c. The RPD households 102 and the panelist households 104 include example media presentation devices 106 and example set top boxes 108. The panelist households 104 include example meters 110. The example environment 100 further includes an example audience measurement entity (AME) 112 including an example return path data adjuster 114.

The example RPD households 102 of the illustrated example of FIG. 1 are households that communicate return path data that is subsequently used for media measurement. For example, the RPD households 102 include set top boxes 108 which communicate return path data to the AME 112. In some examples, the RPD households 102 communicate return path data to a media provider (e.g., a cable television provider, a satellite television provider, etc.), which subsequently communicates the return path data to the AME 112. While only the first, second, and third RPD households 102*a*, 102*b*, 102*c* are depicted in the illustrated example of FIG. 1, the AME 112 can receive return path data from any number of households.

The example panelist households 104 of the illustrated example of FIG. 1 are households that communicate monitoring data (e.g., panelist data) that is subsequently used for media measurement. In some examples, the panelist households 104 are locations at which media monitoring is performed on one or more persons' media consumption and/or on one or more devices' media consumption. For example, an individual can provide consent to be monitored via a portable meter and/or meters associated with specific devices in the individual's household. In some examples, the panelist households 104 include additional hardware and/or software (e.g., the meters 110) installed to provide detailed monitoring data to the AME 112. In some examples, the meters 110 communicate monitoring data to the return path data adjuster 114 of the AME 112. The first, second, and third panelist households 104*a*, 104*b*, 104*c* include set top boxes 108, which can communicate return path data to the AME 112. In some examples, one or more of the first, second, and third panelist households 104*a*, 104*b*, 104*c* may not communicate return path data to the AME 112. While only the first, second, and third panelist households 104*a*, 104*b*, 104*c* are depicted in the illustrated example of FIG. 1, the AME 112 can receive return path data from any number of households.

The example media presentation devices 106 are devices that retrieve media from one or more media provider(s) and present the media at the respective RPD households 102 or panelist households 104. In some examples, the media presentation devices 106 are capable of directly presenting media (e.g., via a display) while, in other examples, the media presentation devices 106 present the media on separate media presentation equipment (e.g., speakers, a display, etc.). Thus, as used herein "media presentation devices" may or may not be able to present media without assistance from an additional device. Media presentation devices are typically consumer electronics. For example, the media presentation devices 106 of the illustrated example are televisions, and thus, may be capable of directly presenting media (e.g., via an integrated and/or connected display and speakers). The media presentation devices 106 of the illustrated example of FIG. 1 access media via the set top boxes 108. In some examples, one or more of the media presentation devices 106 may not access media via a set top box. For example, one or more of the media presentation devices 106 may be smart televisions, capable of connecting to a network and directly obtaining media. In some examples, one or more of the media presentation devices 106 may be connected to a device for reading media on a storage device (e.g., a DVD). Further, while a television is shown in the illustrated example, any other type(s) and/or number(s) of media presentation device(s) may additionally or alternatively be used in any of the RPD households 102 or the panelist households 104. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The example set top boxes 108 of the illustrated example of FIG. 1 access media, communicate media to the media presentation devices 106, and communicate return path data to the AME 112. In some examples, the set top boxes 108 are provided by a cable provider, a satellite television provider, or other media provider. In some examples, one or more of the set top boxes 108 communicate return path data to a media provider (e.g., a cable provider, a satellite television provider, etc.), which subsequently communicates the return path data to the AME 112. The return path data includes tuning data, indicating whether the set top box was powered on or off, what station the set top box was turned to, the media that was being presented (e.g., identification information for a television show, identification information for a commercial, etc.), and/or any other information pertaining to media consumption. In some examples, one or more of the set top boxes 108 may communicate return path data directly to the AME 112. In some examples, return path data may be generated and/or communicated via a different device (e.g., not a set top box). In some examples, one or more of the media presentation devices 106 can be a smart television or other media presentation device that can access media without a set top box, by accessing media independently (e.g., via a network connection to a streaming service, via an internal tuner on the media presentation device, etc.) or via a different device (e.g., a gaming console, a digital media player, etc.) and communicating return path data to a media provider and/or the AME 112. In some examples, one or more of the set top boxes 108 may be integrated into a respective media presentation device (e.g., one or more of the media presentation devices 106).

The example meters 110 of the illustrated example of FIG. 1 collect media monitoring information. In some examples, the meters 110 are portable meters carried by one or more individual panelists. In some examples, the meters 110 are used to monitor one or more specific devices (e.g., the media presentation devices 106 and/or the set top boxes 108). In such examples, the meters 110 may have direct connections (e.g., physical connections) to the devices to be monitored, and/or may be connected wirelessly (e.g., via Wi-Fi, via Bluetooth, etc.) to the devices to be monitored. The meters 110 can collect audio data, tuning data, video data, location data, and/or any other data to enable media monitoring at the panelist households 104. In some examples, the meters 110 are associated with panelists, but not necessarily associated with specific physical locations (e.g., a respective household of the households 104). The meters 110 communicate monitoring data to the AME 112. In some examples, the meters 110 specifically communicate monitoring data to the return path data adjuster 114 of the AME 112. In some examples, the meters 110 communicate monitoring data that is more accurate and/or more granular (e.g., including more detail) than tuning data conveyed in the return path data from the set top boxes 108.

The example AME 112 of the illustrated example of FIG. 1 is an entity responsible for collecting media monitoring information. The example AME 112 collects return path data from the RPD households 102 and/or one or more of the panelist households 104 and collects monitoring data (e.g., panelist data) from the panelist households 104. In some examples, the AME 112 is associated with one or more locations (e.g., a central facility) where data is aggregated and/or analyzed. The example AME 112 includes the return path data adjuster 114 to identify potential systematic tuning data defects in return path data and make corrections based on the monitoring data.

The example return path data adjuster 114 of the illustrated example of FIG. 1 identifies possible systematic defects in tuning volume data generated from return path data and performs actions to correct return path data in order to generate corrected tuning volume data. In some examples, the return path data adjuster 114 compares raw tuning volume data generated from return path data with tuning volume data from monitoring data to identify suspect time windows. The suspect time windows correspond to time frames where the tuning volume data generated from return path data differs (e.g., exceeds a suspect threshold) from tuning volume data generated from monitoring data, while accounting for the difference in sample size between the return path data and the monitoring data. In some examples, the return path data adjuster 114 determines a discrepancy duration corresponding to an amount of time for which the tuning volume data generated from return path data differs from the tuning volume data generated from monitoring data. In some examples, the return path data adjuster 114 identifies individual return path data entries corresponding to set top boxes which turned off during a suspect time window and did not turn on again within the discrepancy duration, and flags such return path data entries as suspect return path data entries. In such examples, the return path data adjuster 114 modifies suspect return path data entries such that the suspect return path data entries indicate set top boxes remaining on at the time that the set top boxes originally turned off within the suspect time window and indicate remaining on for a duration determined via a probability distribution. The return path data adjuster 114 can perform any techniques to help mitigate the effects of systematic defects in tuning volume data generated from return path data (e.g., due to power outages, due to unexpected set top box restarts, etc.). Further detail of the structure of the return path data adjuster 114 and the techniques performed by the return path data adjuster 114 is described in connection with FIG. 2.

In operation, the RPD households 102 and the panelist households 104 include media presentation devices 106 that present media presentations and set top boxes 108 that communicate return path data. The panelist households 104 also include the meters 110 which communicate monitoring information to the AME 112, and specifically to the return path data adjuster 114. The return path data adjuster 114 accesses return path data and monitoring data to generate corrected tuning volume data.

Figure 2:
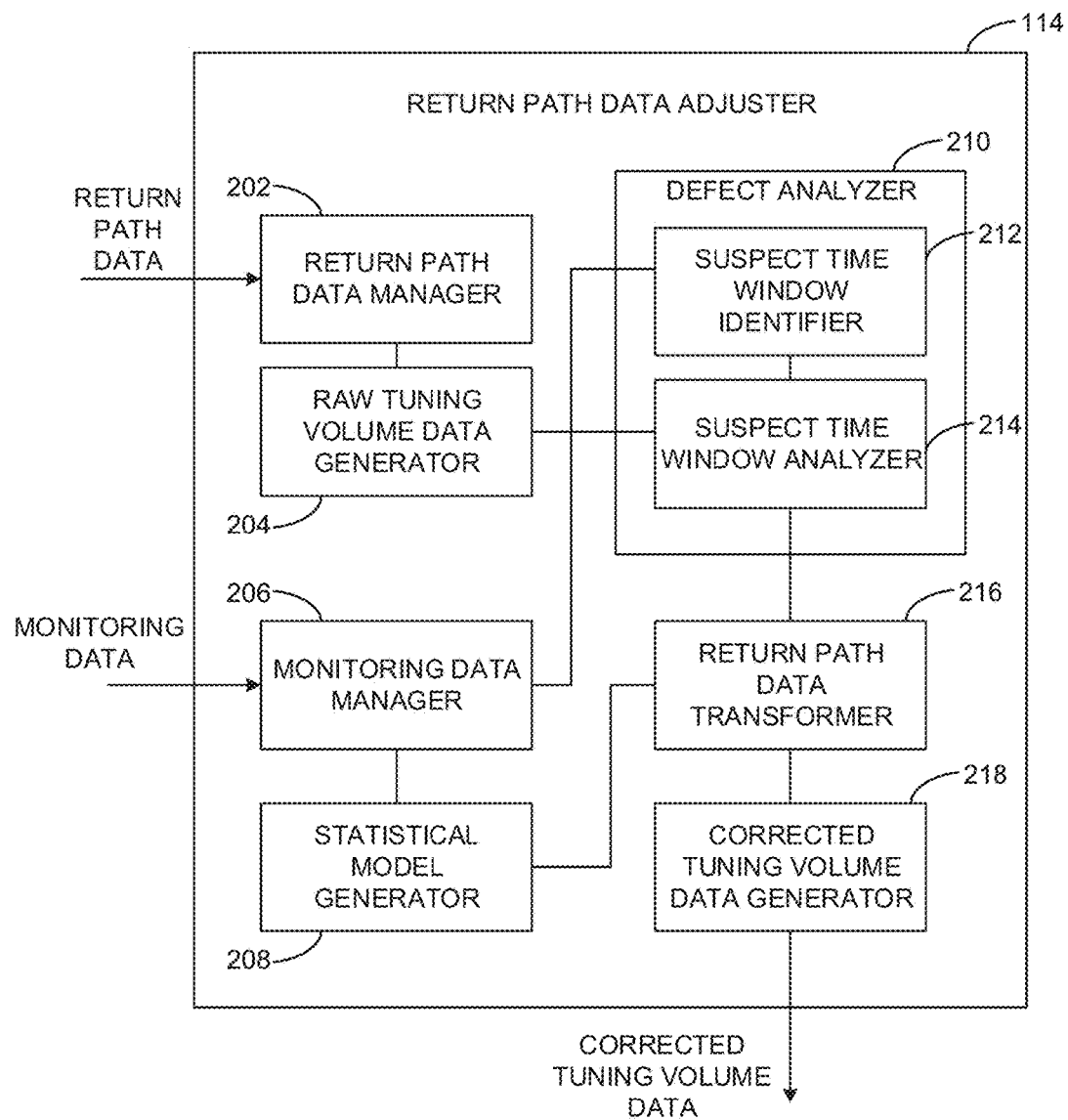
FIG. 2 is a block diagram of an example return path data adjuster of FIG. 1 constructed in accordance with the teachings of this disclosure.

FIG. 2 is a block diagram of an example return path data adjuster 114 constructed in accordance with the teachings of this disclosure. The example return path data adjuster 114 includes an example return path data manager 202, an example raw tuning volume data generator 204, an example monitoring data manager 206, an example statistical model generator 208, an example defect analyzer 210, an example suspect time window identifier 212, an example suspect time window analyzer 214, an example return path data transformer 216, and an example corrected tuning volume data generator 218.

The example return path data manager 202 of the illustrated example of FIG. 2 accesses return path data. In some examples, the return path data manager 202 accesses return path data from set top boxes (e.g., the set top boxes 108 of the example environment 100). For example, a media provider (e.g., a cable television provider, a satellite television provider, etc.) can transmit return path data to the return path data manager 202. In some examples, the return path data manager 202 parses return path data to extract, isolate, and/or identify elements of the data in the return path data from which tuning data can be ascertained. In some examples, the return path data manager 202 communicates the return path data to the raw tuning volume data generator 204.

Figure 6:
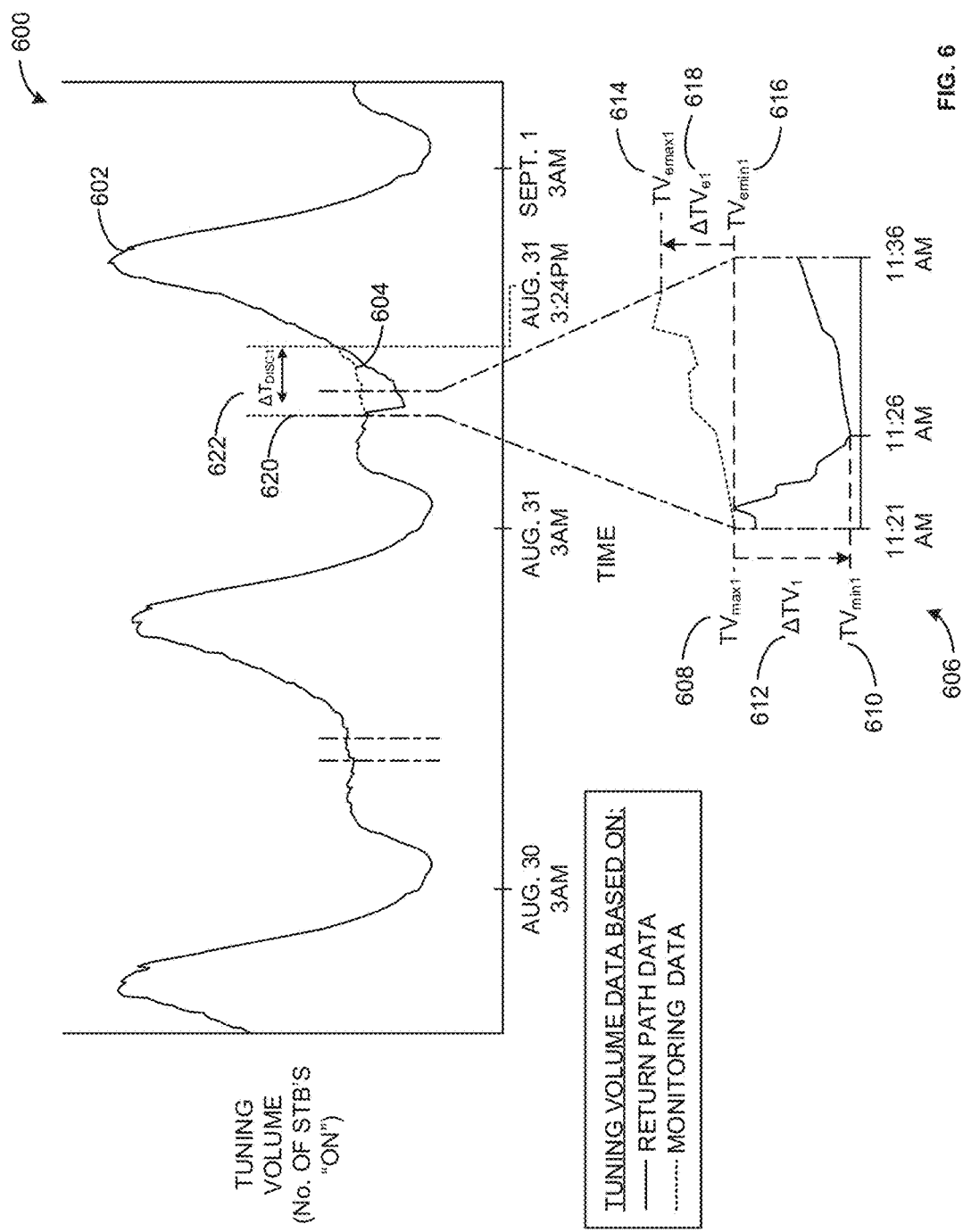
FIG. 6 is an example first tuning volume plot including first raw tuning volume data and first tuning volume data based on monitoring data depicting a first type of tuning data defect.
Figure 8:
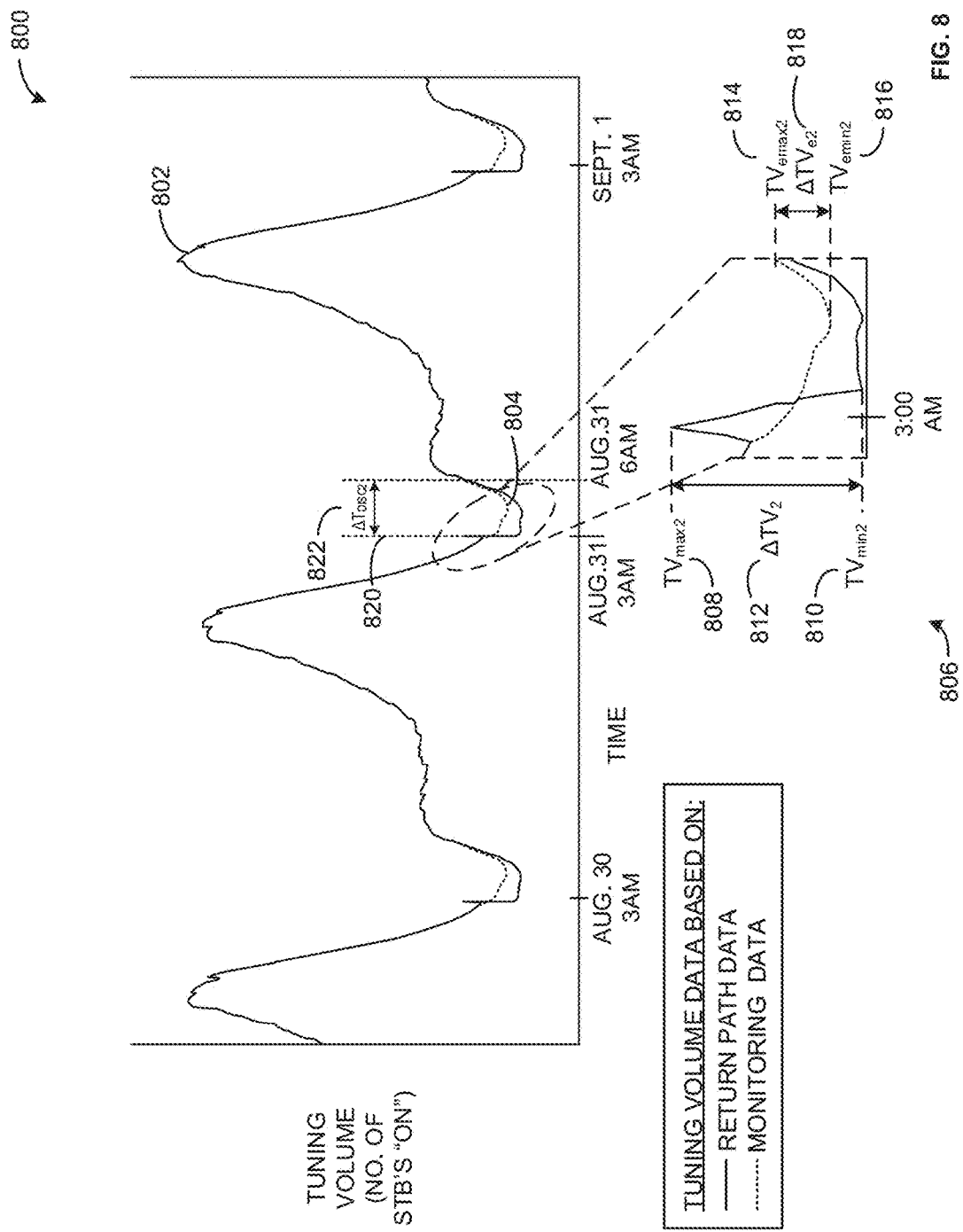
FIG. 8 is an example second tuning volume plot including second raw tuning volume data and second tuning volume data based on monitoring data depicting a second type of tuning data defect.

The example raw tuning volume data generator 204 of the illustrated example of FIG. 2 generates raw tuning volume data from return path data. For example, the raw tuning volume data generator 204 receives return path data from the return path data manager 202 and determines raw tuning volume data representing how many set top boxes were in an on state and how many set top boxes were in an off state at a specific time. For example, the raw tuning volume data generator 204 can determine tuning volume data corresponding to a number of set top boxes that report being in an on state (e.g., powered on and presenting media) throughout a time period (e.g., one day, one week, etc.). Example plots including raw tuning volume data are illustrated and described in connection with FIG. 6 and FIG. 8, depicting raw tuning volume data for a period of approximately 30 hours plotted along with scaled tuning volume data based on monitored data. In some examples, raw tuning volume data may be generated for a specific station and/or a specific program. The raw tuning volume data generated by the raw tuning volume data generator 204 is distinct from the corrected tuning volume data generated by the corrected tuning volume data generator 218, in that the raw tuning volume data includes tuning volumes as initially reported by return path data, prior to performing the techniques to correct systematic tuning data defects disclosed herein.

The example monitoring data manager 206 of the illustrated example of FIG. 2 accesses, stores, and/or communicates monitoring data. In some examples, the monitoring data manager 206 receives monitoring data from meters (e.g., the meters 110) of panelist households (e.g., the panelist households 104). In some examples, the monitoring data manager 206 extracts, isolates, and/or identifies tuning data from the monitoring data, for use in comparisons with the tuning volume data based on return path data output by the raw tuning volume data generator 204. In some examples, the monitoring data manager 206 generates tuning volume data based on tuning data included in the monitoring data. In some examples, the monitoring data manager 206 performs operations to enable easier comparison of tuning volume data based on monitoring data with tuning volume data based on return path data. For example, the monitoring data manager 206 may scale up the tuning volume data based on the monitoring data by multiplying tuning volume values by a ratio based on the sample size of the return path data relative to the sample size of the monitoring data. For example, if one-hundred thousand households are represented in the tuning volume data based on the return path data, and only five thousand households are represented in the tuning volume data based on the monitoring data, the tuning volume values based on the monitoring data can be multiplied by twenty to enable comparison. For example, in the plots illustrated and described in connection with FIG. 6 and FIG. 8, the tuning volume data based on monitoring data (e.g., represented by the dashed line) is scaled up to enable comparison of the tuning volume data from based on return path data with the tuning volume data based on monitoring data.

The example statistical model generator 208 generates, updates, and stores statistical models associated with tuning behavior based on monitoring data. In some examples, the statistical model generator 208 analyzes monitoring data accessed by the monitoring data manager 206 to determine statistical parameters such as an average time that set top boxes are in an on state, a deviation associated with set top box on state durations, an average time between presentation sessions (e.g., an average time spent in an off state), a deviation associated with set top box off state durations, etc.

In some examples, the return path data transformer 216 requests a statistical model from the statistical model generator 208 to correct a suspect return path data entry that may be associated with a systematic tuning data defect. The return path data transformer 216 may communicate to the statistical model generator 208 a time, a time range, and/or a data set (e.g., subset of the overall data) of the return path data and/or the monitoring data that is associated with the suspect return path data entry. For example, the return path data transformer 216 can communicate to the statistical model generator 208 a time that a suspect return path data entry indicates a set top box turned off and a discrepancy duration. The discrepancy duration is based on the amount of time for which there is a discrepancy between the tuning volume data based on return path data and the tuning volume data based on monitoring data (e.g., as identified by the suspect time window analyzer 214). The statistical model generator 208 may output parameters corresponding to a statistical model that can be used to assign new on state durations for the suspect return path data entries to correct the tuning volume data based on the return path data.

In some examples, the statistical model generator 208 can be configured to output a statistical model, such as for example a uniform distribution, with equal probabilities of all on state durations from zero seconds up until the end of the discrepancy duration. In some examples, the statistical model generator 208 can output a more sophisticated model based on typical tuning volume behavior at a time associated with the tuning data defect. For example, if monitoring data indicates that typically set top boxes from 12 AM-3 AM remain on for longer durations than set top boxes from 7 AM-9 AM, and a suspect return path data entry associated with a possible tuning data defect at 2:00 AM is to be corrected, the statistical model generator 208 may provide the return path data transformer 216 with a statistical model based on a distribution of durations that is relatively long (e.g., longer than a similar model addressing a suspect return path data entry at 8 AM).

The example defect analyzer 210 of the illustrated example of FIG. 2 identifies and analyzes suspect time windows associated with raw tuning volume data generated from return path data. In some examples, the defect analyzer 210 includes the suspect time window identifier 212 to identify suspect time windows in the raw tuning volume data. For example, the defect analyzer 210 can identify suspect time windows by comparing the raw tuning volume data based on the return path data with scaled up tuning volume data based on the monitoring data (e.g., a difference between an expected maximum tuning volume value and an expected minimum tuning volume value). In some examples, the defect analyzer 210 includes the suspect time window analyzer 214 to further analyze the suspect time windows identified by the suspect time window identifier 212. For example, the defect analyzer 210 can determine a discrepancy duration corresponding to an amount of time for which the raw tuning volume data based on the return path data and the scaled up tuning volume data based on the monitoring data display a difference (e.g., report volumes with a higher percent difference than a discrepancy threshold).

The suspect time window identifier 212 of the illustrated example of FIG. 2 performs comparisons between return path data and monitoring data to identify suspect time windows. In some examples, the suspect time window identifier 212 compares raw tuning volume data generated from return path data with scaled tuning volume data based on monitoring data. For example, the suspect time window identifier 212 can step sequentially through the raw tuning volume data generated from return path data at window-sized increments (e.g., small time increments) and analyze individual time windows of the raw tuning volume data to determine whether the time window is a suspect time window. In some examples, the suspect time window identifier 212 is configured to utilize short time windows for improved accuracy in identifying suspect time windows (e.g., improvement in identifying a possible systematic tuning data defect nearer to the time when the defect starts than is possible when using large time windows). In some examples, the suspect time window identifier 212 determines a maximum tuning volume value and a minimum tuning volume value in the raw tuning volume data for the time window. The suspect time window identifier 212 compares a maximum change value (e.g., a difference between the maximum tuning volume and the minimum tuning volume in the raw tuning volume data) with a maximum change value in the scaled tuning volume data based on the monitoring data. In some examples, the suspect time window identifier 212 determines whether the maximum change value of the tuning volume data based on the return path data for the time window exceeds a suspect threshold when compared to the maximum change value represented by the monitoring data for the time window. For example, the suspect threshold can be determined empirically based on observations of expected difference values between scaled tuning volume data based on monitoring data and raw tuning volume data based on the return path data. For example, the suspect threshold can be a percent difference (e.g., twenty-five percent, forty-percent, etc.) between a maximum change value of the tuning volume data based on monitoring data and a maximum change value of the raw tuning volume data based on return path data. The suspect time window identifier 212 can label one or more time window(s) exceeding the suspect threshold as suspect time window(s), and communicate information for the time window(s) to the suspect time window analyzer 214 for further analysis.

In some examples, the monitoring data utilized to generate tuning volume data for comparison with the raw tuning volume data from return path data is tuning volume data from a different, but similar, time period. For example, the monitoring data can be tuning volume data from the same time range on a different date, if the tuning volume data shows very regular behavior day-to-day. In some examples, such as to detect a systematic tuning data defect that is a power outage, it may be advantageous for the suspect time window identifier 212 to compare the tuning volume data based on return path data with tuning volume data based on monitoring data from a different, but similar time period (e.g., the same time, one day prior) when identifying suspect time windows. Similarly, the suspect time window analyzer 214 may utilize monitoring data from a different, but similar time period (e.g., the same time, one day prior) when analyzing suspect time windows to determine discrepancy durations.

In some examples, the suspect time window identifier 212 and/or the suspect time window analyzer 214 may perform multiple comparisons to increase the possibility of identifying different types of tuning data defects. For example, the suspect time window identifier 212 and/or the suspect time window analyzer 214 may first perform a comparison of tuning volume data based on the return path data with tuning volume data based on monitoring data collected at the same time (e.g., panelist data from media device meters at panelist households) to identify and/or analyze any systematic tuning data defects that are unique to the return path data. The suspect time window identifier 212 and/or the suspect time window analyzer 214 can additionally or alternatively perform a second comparison, with the tuning volume data based on the return path data compared to tuning volume data based on monitoring data from a different, but similar time period, to identify and/or analyze systematic tuning defects that are not specific to the return path data (e.g., power outages).

The example suspect time window analyzer 214 of the illustrated example of FIG. 2 analyzes suspect time windows identified by the suspect time window identifier 212. In some examples, the suspect time window analyzer 214 determines discrepancy durations for one or more of the suspect time windows identified by the suspect time window identifier 212. For example, the suspect time window analyzer 214 can, upon receiving an indication of a suspect time window from the suspect time window identifier 212, analyze successive time windows after the suspect time window to determine a discrepancy duration. In some examples, the suspect time window analyzer 214 determines the discrepancy duration as an amount of time after the suspect time window during which the raw tuning volume data based on the return path data remains different from the scaled tuning volume data based on the monitoring data by more than a discrepancy threshold amount (e.g., more than a threshold percentage, more than a threshold tuning volume quantity, etc.). A possible systematic tuning defect persists as long as a maximum change value between the tuning volume data based on return path data and the tuning volume data based on monitoring data exceeds the discrepancy threshold. For example, if the suspect threshold for a time window is set to be twenty-five percent, a time window will be designated a suspect time window if a maximum change value for the tuning volume data based on return path data differs from a maximum change value for the tuning volume data based on monitoring data by more than twenty-five percent. If the discrepancy threshold is set to fifteen percent, then the data is analyzed to determine a time after the suspect time window at which the maximum change value for the tuning volume data based return path data is less than fifteen percent different (e.g., relative to the overall tuning volume quantity based on the return path data) from the maximum change value for the tuning volume data based on monitoring data. In some examples, the suspect threshold and the discrepancy threshold are set to the same value.

In some examples, following a systematic tuning data defect (e.g., an outage where return path data is not reported for a certain period of time due to an end of a reporting period), the tuning volume data based on the return path data may remain different than the tuning volume data based on the monitoring data, as the tuning volume data may require time to readjust, depending on the time of systematic tuning data defect. For example, if some set top boxes experience an end of a reporting period for return path data at 3 AM, and do not restart collection of tuning data for return path data until 3:30 AM, the discrepancy may last approximately thirty minutes.

The example return path data transformer 216 of the illustrated example of FIG. 2 analyzes and modifies return path data entries to correct systematic tuning data defects. In some examples, the return path data transformer 216 identifies suspect return path data entries by determining return path data entries that satisfy criteria during a suspect time window. In some examples, the return path data transformer 216 identifies return path data entries that (1) report that a set top box experienced a first transition from an on state to an off state within a suspect time window and (2) report that the set top box did not experience a second transition from the off state to the on state within a discrepancy duration. In some examples, in response to a return path data entry meeting these criteria, the return path data transformer 216 flags (e.g., labels) the return path data entry as a suspect return path data entry.

In some examples exhibiting a different type of systematic tuning data defect, the return path data transformer 216 identifies return path data entries that (1) report that a set top box experienced a first transition from an off state to an on state within a suspect time window, (2) report that the set top box experienced a second transition from the on state to the off state within the suspect time window, and (3) report that the set top box did not experience a third transition from the off state to the on state within the discrepancy duration. Similarly, in some examples, in response to a return path data entry meeting these criteria, the return path data transformer 216 flags (e.g., labels) the return path data entry as a suspect return path data entry.

After identifying suspect return path data entries, the return path data transformer 216 can modify the suspect return path data entries to mitigate systematic tuning data defects in the tuning volume data. In some examples, the return path data transformer 216 eliminates a transition from an on state to an off state during the suspect time window and utilizes a probability distribution (e.g., as determined by the statistical model generator 208) to assign the return path data entry a new transition time indicative of a transition from the on state to the off state. In some examples, the return path data transformer 216 queries the statistical model from the statistical model generator 208 to assign the suspect return path data entry a new time indicative of a transition from the on state to the off state that is after the time that the return path data entry originally indicated the set top box transitioned from the on state to the off state but prior to the end of the discrepancy duration. Example plots of set top box tuning data for a corrected suspect return path data entry are depicted in FIG. 7B and FIG. 9C.

The example corrected tuning volume data generator 218 of the illustrated example of FIG. 2 generates corrected tuning volume data based on return path data that has been transformed by the return path data transformer 216. In some examples, the corrected tuning volume data generator 218 generates corrected tuning volume data, corresponding to an overall number of set top boxes that are in an on state, based on the corrected return path data and/or other return path data that may not have needed correction. In some examples, after generating corrected tuning volume data, the corrected tuning volume data generator 218 compares the corrected tuning volume data to tuning volume data based on monitoring data from the monitoring data manager 206 to determine whether previously identified defects in the tuning volume data based on the return path data have been corrected. In some examples, in response to determining the defects still exist, the processes of the defect analyzer 210 and the return path data transformer 216 are performed again to identify suspect time windows, analyze suspect time windows, correct return path data entries associated with the suspect time windows, and/or generate new corrected tuning volume data. Thus, an iterative comparison process can be performed to correct suspect return path data entries until tuning volume data based on the return path data entries is similar to tuning volume data based on monitoring data (e.g., maximum change values between the tuning volume data based on return path data and tuning volume data based on monitoring data for time windows are less than a suspect threshold).

In operation, the return path data manager 202 accesses return path data and communicates the return path data to the raw tuning volume data generator 204 to generate raw tuning volume data based on the return path data. The monitoring data manager 206 accesses monitoring data and communicates the monitoring data to the statistical model generator 208 to generate a statistical model based on tuning behavior reflected in the monitoring data. The defect analyzer 210 identifies suspect time windows via the suspect time window identifier 212 by comparing the raw tuning volume data with tuning volume data based on the monitoring data, and subsequently determines a discrepancy duration associated with a possible systematic tuning data defect using the suspect time window analyzer 214. The return path data transformer 216 subsequently identifies suspect return path data entries associated with the suspect time window(s) and modifies the suspect return path data entries to correct the systematic tuning data defect. Following correction of the suspect return path data entries, the corrected tuning volume data generator 218 generates corrected tuning volume data.

While an example manner of implementing the return path data adjuster 114 of FIG. 1 is illustrated in FIG. 2, one or more of the elements, processes and/or devices illustrated in FIG. 2 may be combined, divided, re-arranged, omitted, eliminated and/or implemented in any other way. Further, the example return path data manager 202, the example raw tuning volume data generator 204, the example monitoring data manager 206, the example statistical model generator 208, the example defect analyzer 210, the example suspect time window identifier 212, the example suspect time window analyzer 214, the example return path data transformer 216, the example corrected tuning volume data generator 218 and/or, more generally, the example return path data adjuster 114 of FIG. 2 may be implemented by hardware, software, firmware and/or any combination of hardware, software and/or firmware. Thus, for example, any of the example return path data manager 202, the example raw tuning volume data generator 204, the example monitoring data manager 206, the example statistical model generator 208, the example defect analyzer 210, the example suspect time window identifier 212, the example suspect time window analyzer 214, the example return path data transformer 216, the example corrected tuning volume data generator 218 and/or, more generally, the example return path data adjuster 114 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, return path data manager 202, the example raw tuning volume data generator 204, the example monitoring data manager 206, the example statistical model generator 208, the example defect analyzer 210, the example suspect time window identifier 212, the example suspect time window analyzer 214, the example return path data transformer 216, the example corrected tuning volume data generator 218 is/are hereby expressly defined to include a non-transitory computer readable storage device or storage disk such as a memory, a digital versatile disk (DVD), a compact disk (CD), a Blu-ray disk, etc. including the software and/or firmware. Further still, the example return path data adjuster 114 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
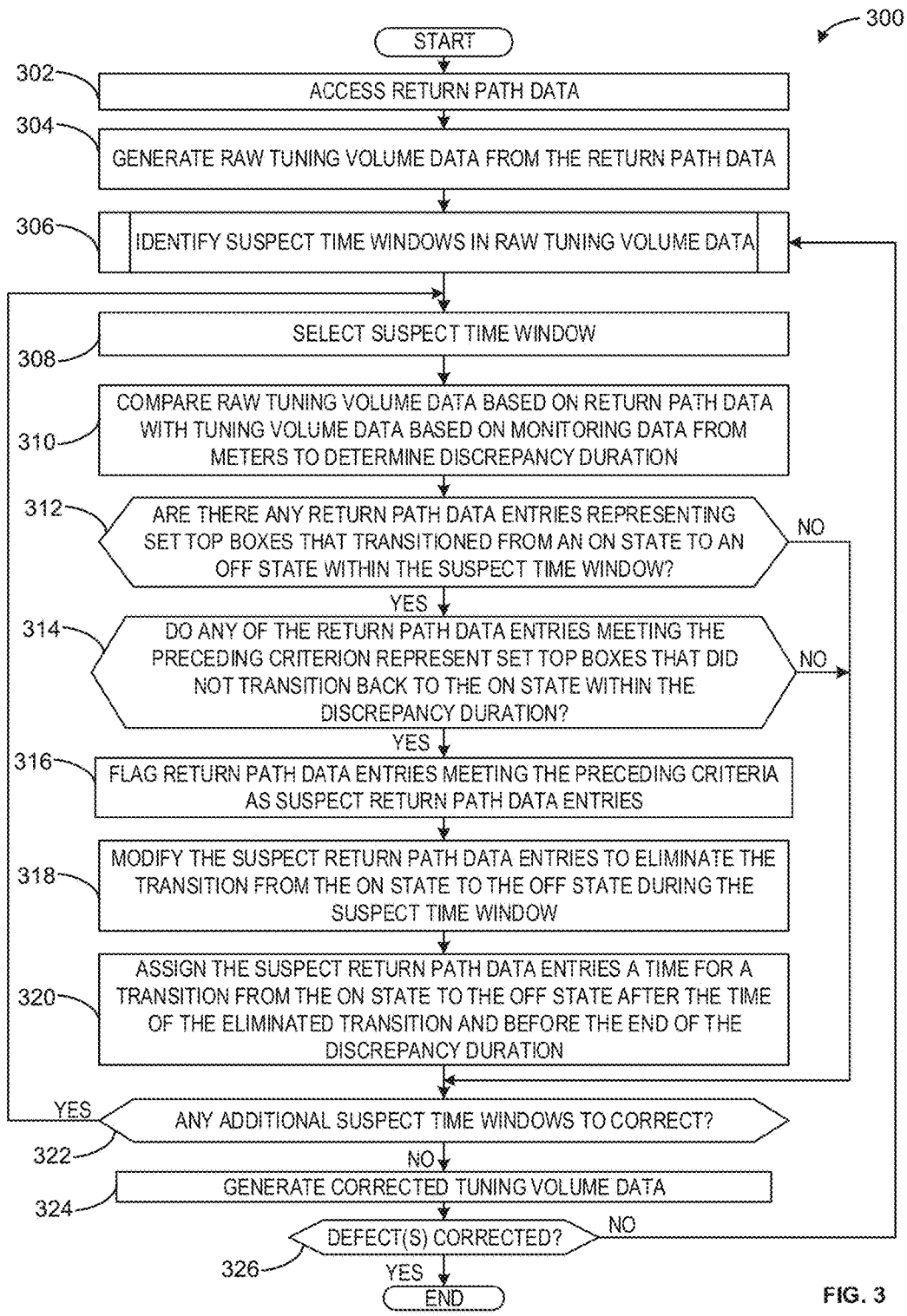
FIG. 3 is a flowchart representative of machine readable instructions which may be executed to implement the example return path data adjuster of FIGS. 1 and 2 to perform a first technique to correct tuning data.
Figure 4:
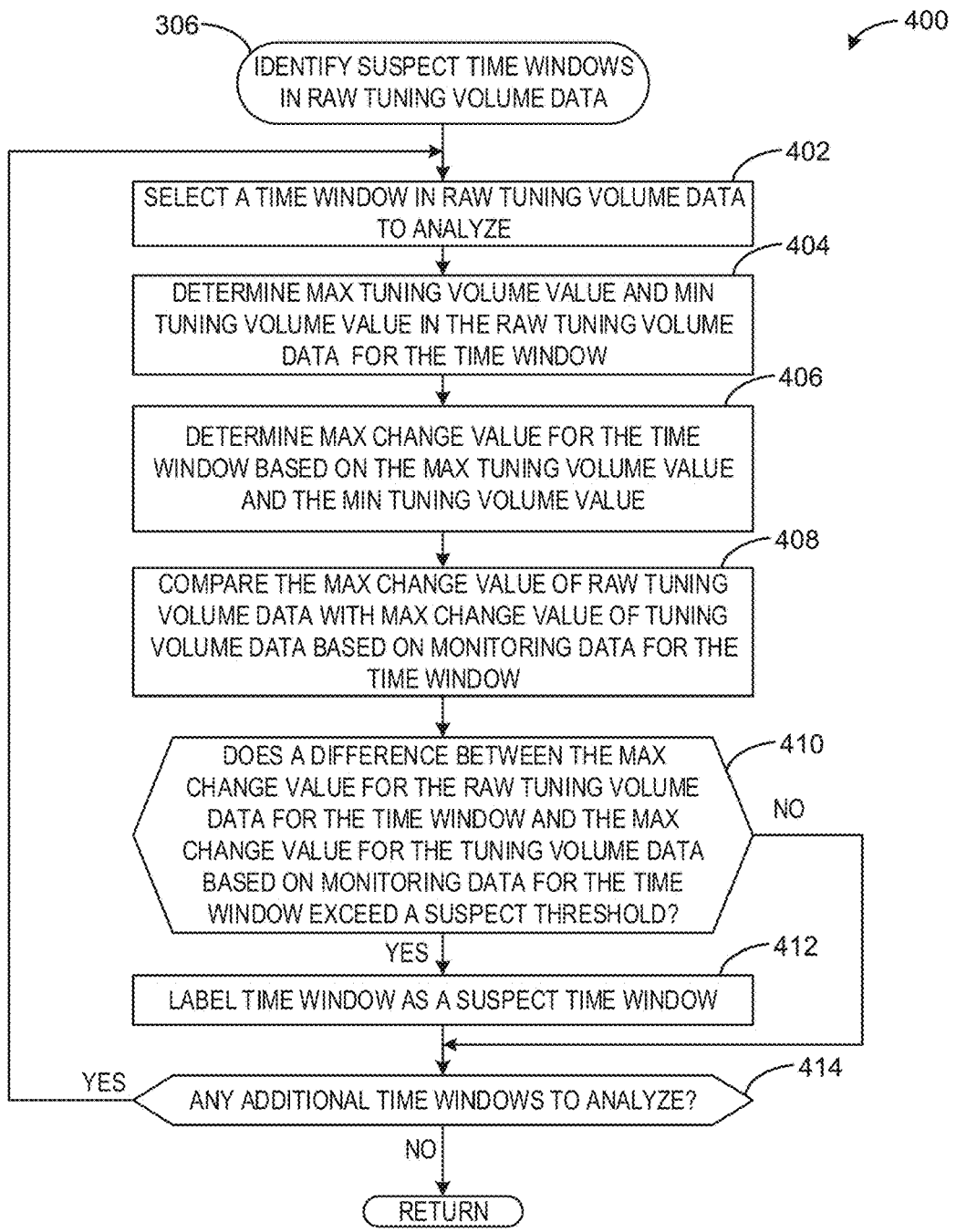
FIG. 4 is a flowchart representative of machine readable instructions which may be executed to implement the example return path data adjuster of FIGS. 1 and 2 to identify suspect time windows in raw tuning volume data.
Figure 5:
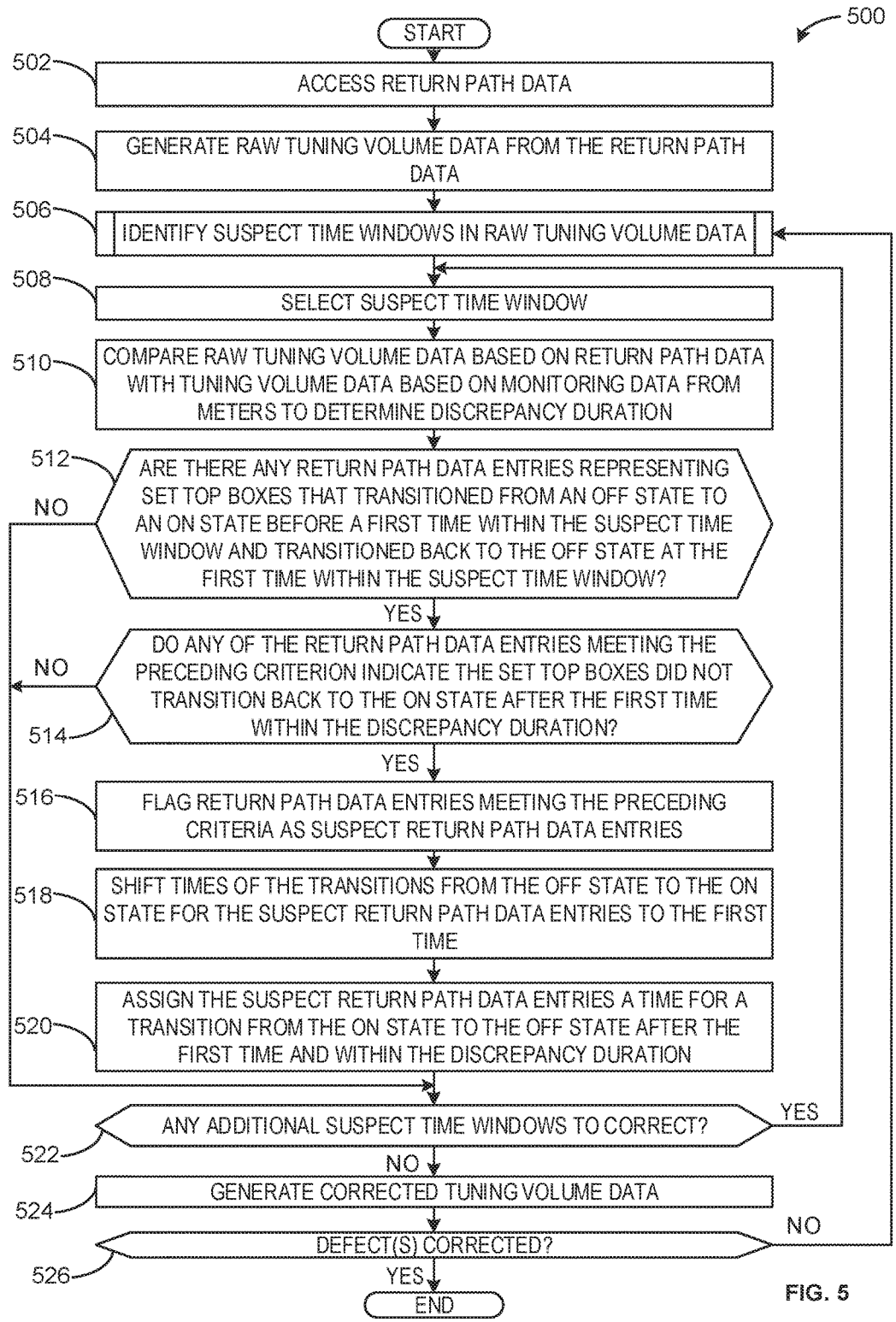
FIG. 5 is a flowchart representative of machine readable instructions which may be executed to implement the example return path data adjuster of FIGS. 1 and 2 to perform a second technique to correct tuning data.

Flowcharts representative of example hardware logic, machine readable instructions, hardware implemented state machines, and/or any combination thereof for implementing the return path data adjuster 114 of FIG. 2 are shown in FIGS. 3-5. The machine readable instructions may be an executable program or portion of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 3-5, many other methods of implementing the example return path data adjuster 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Example machine readable instructions 300 that may be executed by the return path data adjuster 114 to perform a first technique to correct tuning data are illustrated in FIG. 3. With reference to the preceding figures and associated descriptions, the example machine readable instructions 300 of FIG. 3 begin with the example return path data adjuster 114 accessing return path data (block 302). In some examples, the return path data manager 202 accesses return path data from set top boxes (e.g., the set top boxes 108 of FIG. 1).

At block 304, the example return path data adjuster 114 generates raw tuning volume data from the return path data. In some examples, the raw tuning volume data generator 204 generates raw tuning volume data from the return path data. For example, the raw tuning volume data generator 204 can determine raw tuning volume values by determining numbers of set top boxes that are in an on state. For example, the raw tuning volume data generator 204 can generate raw tuning volume data as illustrated in the example plots of FIG. 6 and FIG. 8.

At block 306, the example return path data adjuster 114 identifies suspect time windows in raw tuning volume data. In some examples, the suspect time window identifier 212 identifies suspect time windows in raw tuning volume data. Example approaches to identify suspect time windows in raw tuning volume data are disclosed in further detail in connection with FIG. 4.

At block 308, the example return path data adjuster 114 selects a suspect time window. In some examples, the suspect time window analyzer 214 selects a suspect time window to further analyze the suspect time window and/or to determine a discrepancy duration.

At block 310, the example return path data adjuster 114 compares raw tuning volume data based on return path data with tuning volume data based on monitoring data from meters to determine discrepancy duration. In some examples, the suspect time window analyzer 214 accesses raw tuning volume data from the raw tuning volume data generator 204 as well as tuning volume data based on monitoring data from the monitoring data manager 206. In some examples, the suspect time window analyzer 214 begins analysis at the suspect time window, and the suspect time window analyzer 214 compares tuning volume values between the raw tuning volume data and the tuning volume data based on the monitoring data to determine a difference quantity representing a difference between the values. For example, the suspect time window analyzer 214 may determine a percent difference between a tuning volume value represented in the raw tuning volume data and a tuning volume value represented in the tuning volume data based on monitoring data. The suspect time window analyzer 214 can compare the difference quantity to a discrepancy threshold to determine whether the possible systematic tuning data defect is ongoing (e.g., indicating the discrepancy time period is ongoing). For example, if the discrepancy threshold is set to be 20% difference between the raw tuning volume data and the tuning volume data based on monitoring data, the suspect time window analyzer 214 can compare the difference quantity representing the difference between the raw tuning volume data and the tuning volume data based on monitoring data and determine a time at which the difference quantity satisfies the discrepancy threshold (e.g., the percent difference becomes less than 20%, thus indicating the discrepancy period is over).

In some examples, in response to the suspect time window analyzer 214 identifying a time at which the difference quantity satisfies the discrepancy threshold, the suspect time window analyzer 214 stores as the discrepancy duration. In some examples, the discrepancy duration is stored as a duration of time between the end time of the suspect time window and the time at which the difference quantity satisfied the discrepancy threshold (e.g., indicating the discrepancy corresponding to a possible systematic tuning data defect appears to have concluded).

At block 312, the example return path data adjuster 114 determines whether there are any return path data entries representing set top boxes that transitioned from an on state to an off state within the suspect time window. In some examples, the return path data transformer 216 determines whether there are any return path data entries representing set top boxes which transitioned from the on state to the off state within the suspect time window, as these set top boxes may be associated with the possible systematic tuning data defect. In response to there being return path data entries representing set top boxes that transitioned from the on state to the off state within the suspect time window, processing transfers to block 314. Conversely, in response to there not being return path data entries representing set top boxes that transitioned from the on state to the off state within the suspect time window, processing transfers to block 322.

At block 314, the example return path data adjuster 114 determines whether any of the return path data entries meeting the preceding criterion represent set top boxes that did not transition back to the on state within the discrepancy duration. In some examples, the return path data transformer 216 determines whether any of the return path data entries meeting the preceding criterion (e.g., representing set top boxes that transitioned from an on state to an off state within the suspect time window) represent set top boxes that did not transition back to the on state within the discrepancy duration. For example, if the suspect time window analyzer 214 determines that the discrepancy duration extends fifteen minutes after the suspect time window, the return path data transformer 216 can analyze return path data entries to determine whether any of the return path data entries meeting the preceding criterion represent set top boxes that did not transition from the off state to the on state within the fifteen minute time period (the discrepancy duration) after the suspect time window. In response to any of the return path data entries meeting the preceding criterion representing set top boxes that did not transition back to the on state within the discrepancy duration, processing transfers to block 316. Conversely, in response to none of the return path data entries meeting the preceding criterion representing set top boxes that did not transition back to the on state within the discrepancy duration, processing transfers to block 322.

At block 316, the example return path data adjuster 114 flags return path data entries meeting the preceding criteria as suspect data entries. In some examples, the return path data transformer 216 flags (e.g., labels) return path data entries meeting the preceding criteria as suspect data entries.

At block 318, the example return path data adjuster 114 modifies the suspect return path data entries to eliminate the transition from the on state to the off state during the suspect time window. In some examples, the return path data transformer 216 modifies the suspect return path data entries to eliminate the transition from the on state to the off state during the suspect time window. An example modification to return path data to eliminate the transition from the on state to the off state is illustrated in the corrected return path data depicted in the set top box power status plot of FIG. 7B. In some examples, as opposed to eliminating the transition from the on state to the off state, the transition from the on state to the off state can be shifted using the procedure described in block 320 to assign a time for a transition from the on state to the off state. For example, instead of eliminating the original transition in the return path data during the suspect time window from the on state to the off state, the transition is merely moved to a later time using the procedure of block 320 (e.g., assigning, based on a probability distribution, a time for the transition).

At block 320, the example return path data adjuster 114 assigns the suspect return path data entries a time for a transition from the on state to the off state after the time of the eliminated transition and before the end of the discrepancy duration. In some examples, the return path data transformer 216 assigns, based on a probability distribution accessed from the statistical model generator 208, a tie for a transition from the on state to the off state after the time of the eliminated transition and before the end of the discrepancy duration determined by the suspect time window analyzer 214. For example, the return path data transformer 216 can query the statistical model generator 208 to cause a statistical model to output a time between the time of the eliminated transition (e.g., the transition eliminated at block 318, associated with a transition from the on state to the off state during the suspect time window) and the discrepancy duration (e.g., the discrepancy duration determined at block 310), which the return path data transformer 216 can use to create a new transition from the on state to the off state at the assigned time. An example of a new transition based on an assigned time determined based on a statistical model is illustrated in the corrected return path data depicted in the set top box power status plot of FIG. 7B.

At block 322, the example return path data adjuster 114 determines whether there are any additional suspect time windows to correct. In some examples, the suspect time window identifier 212 determines whether there are any additional suspect time windows to correct. In response to there being additional suspect time windows to correct, processing transfers to block 308. Conversely, in response to there not being any additional suspect time windows to correct, processing transfers to block 324.

At block 324, the example return path data adjuster 114 generates corrected tuning volume data. In some examples, the corrected tuning volume data generator 218 generates corrected tuning volume data. For example, the corrected tuning volume data generator 218 calculates tuning volume quantities based on the corrected return path data. In some examples, after generating corrected tuning volume data, the return path data adjuster 114 determines and/or the corrected tuning volume data generator 218 determines whether the corrected tuning volume data has corrected the possible systematic tuning data defect(s) (block 326). In some examples, in response to the corrected tuning volume data not adequately correcting the possible systematic tuning data defect(s) (bock 326), processing can transfer to block 306 to repeat the procedure to make further corrections to return path data. In some example, if the system tuning data defect(s) has been corrected (block 326), the example program 300 ends.

Example machine readable instructions 400 that may be executed by the example return path data adjuster 114 to identify suspect time windows in raw tuning volume data are illustrated in FIG. 4. With reference to the preceding figures and associated descriptions, the example machine readable instructions 400 of FIG. 4 begin with the example return path data adjuster 114 selecting a time window in the raw tuning volume data to analyze (block 402). In some examples, the suspect time window identifier 212 selects a time window in the raw tuning volume data to analyze. In some examples, the suspect time window identifier 212 selects time windows of the raw tuning volume data sequentially.

At block 404, the example return path data adjuster 114 determines a maximum tuning volume value and a minimum tuning volume value in the raw tuning volume data for the window. In some examples, the suspect time window identifier 212 determines the maximum tuning volume value and the minimum tuning volume value in the raw tuning volume data for the window.

At block 406, the example return path data adjuster 114 determines a maximum change value for the time window based on the maximum tuning volume value and the minimum tuning volume value. In some examples, the suspect time window identifier 212 determines a maximum change value for the time window based on the maximum tuning volume value and the minimum tuning volume value. In some examples, the suspect time window identifier 212 subtracts the minimum tuning volume value from the maximum tuning volume value to determine the maximum change value. The example suspect time window identifier 212 can utilize any type of calculation to determine the maximum change value. For example, instead of, or in addition to subtracting the two values, the suspect time window identifier 212 could create a ratio by dividing the maximum tuning volume value by the minimum tuning volume value.

At block 408, the example return path data adjuster 114 compares the maximum change value of the raw tuning volume data with a maximum change value of the tuning volume data based on monitoring data for the time window. In some examples, the suspect time window identifier compares the maximum change value of raw tuning volume data with a maximum change value of tuning volume data based on monitoring data for the time window. For example, the suspect time window identifier 212 can retrieve tuning volume data based on monitoring data associated with the time window from the monitoring data manager 206 and perform the steps of blocks 404 and 406 to determine a maximum tuning volume value, a minimum tuning volume value, and a maximum change value for the tuning volume data based on monitoring data. Example plots depicting a comparison of a maximum change value for raw tuning volume data with a maximum change value of tuning volume data based on monitoring data for a time window are depicted in FIG. 6 and FIG. 8.

At block 410, the example return path data adjuster 114 determines whether the difference between the maximum change value for the raw tuning volume data for the time window and the maximum change value for the tuning volume data based on monitoring data for the time window exceeds a suspect threshold. In some examples, the suspect time window identifier 212 determines whether the difference between the maximum change value for the raw tuning volume data for the time window and the maximum change value for the tuning volume data based on monitoring data for the time window exceeds a suspect threshold. For example, the suspect time window identifier 212 can determine a difference between the maximum change value for the raw tuning volume data and the maximum change value for the tuning volume data based on monitoring data. The suspect time window identifier 212 can compare the difference to a suspect threshold to determine whether the difference indicates a possible suspect time window. In response to determining the difference between the maximum change value for the raw tuning volume data for the time window and the maximum change value for the tuning volume data based on monitoring data for the time window exceeds a suspect threshold, processing transfers to block 412. Conversely, in response to the difference between the maximum change value for the raw tuning volume data for the time window and the maximum change value for the tuning volume data based on monitoring data for the time window not exceeding the suspect threshold, processing transfers to block 414.

At block 412, the example return path data adjuster 114 labels the time window as a suspect time window. In some examples, the suspect time window identifier 212 labels the time window as a suspect time window.

At block 414, the example return path data adjuster 114 determines whether there are any additional time windows to analyze. In some examples, the suspect time window identifier 212 determines whether there are any additional time windows to analyze. In response to there being additional time windows to analyze, processing transfers to block 402. Conversely, in response to there not being additional time windows to analyze, processing returns to block 306 of the machine readable instructions of FIG. 3 or block 506 of the machine readable instructions of FIG. 5.

Example machine readable instructions 500 that may be executed by the return path data adjuster 114 to perform a second technique to correct tuning data are illustrated in FIG. 5. With reference to the preceding figures and associated descriptions, the example machine readable instructions 500 of FIG. 5 begin with the example return path data adjuster 114 accessing return path data (block 502). In some examples, the return path data manager 202 accesses return path data from set top boxes (e.g., the set top boxes 108 of FIG. 1).

At block 504, the example return path data adjuster 114 generates raw tuning volume data from the return path data. In some examples, the raw tuning volume data generator 204 generates raw tuning volume data from the return path data. For example, the raw tuning volume data generator 204 can determine raw tuning volume values by determining numbers of set top boxes that are in an on state. For example, the raw tuning volume data generator 204 can generate raw tuning volume data as illustrated in the example plots of FIG. 6 and FIG. 8.

At block 506, the example return path data adjuster 114 identifies suspect time windows in raw tuning volume data. In some examples, the suspect time window identifier 212 identifies suspect time windows in raw tuning volume data. Example approaches to identify suspect time windows in raw tuning volume data are disclosed in further detail in connection with FIG. 4.

At block 508, the example return path data adjuster 114 selects a suspect time window. In some examples, the suspect time window analyzer 214 selects a suspect time window to further analyze the suspect time window and/or to determine a discrepancy duration.

At block 510, the example return path data adjuster 114 compares raw tuning volume data based on return path data with tuning volume data based on monitoring data from meters to determine discrepancy duration. In some examples, the suspect time window analyzer 214 accesses raw tuning volume data from the raw tuning volume data generator 204 as well as tuning volume data based on monitoring data from the monitoring data manager 206. In some examples, the suspect time window analyzer 214 begins analysis at the suspect time window, and compares tuning volume values between the raw tuning volume data and the tuning volume data based on the monitoring data to determine a difference quantity representing a difference between the values. For example, the suspect time window analyzer 214 may determine a percent difference between a tuning volume value represented in the raw tuning volume data and a tuning volume value represented in the tuning volume data based on monitoring data. The suspect time window analyzer 214 can compare the difference quantity to a discrepancy threshold to determine whether the possible systematic tuning data defect is still ongoing (e.g., indicating the discrepancy time period is ongoing). For example, if the discrepancy threshold is set to be 20% difference between the raw tuning volume data and the tuning volume data based on monitoring data, the suspect time window analyzer 214 can compare the difference quantity representing the difference between the raw tuning volume data and the tuning volume data based on monitoring data and determine a time at which the difference quantity satisfies the discrepancy threshold (e.g., the percent difference becomes less than 20%, thus indicating the discrepancy period is over).

In some examples, in response to the suspect time window analyzer 214 identifying a time at which the difference quantity satisfies the discrepancy threshold, the suspect time window analyzer 214 stores as the discrepancy duration. In some examples, the discrepancy duration is stored as a duration of time between the time of the suspect time window and the time at which the difference quantity satisfied the discrepancy threshold (e.g., indicating the discrepancy corresponding to a possible systematic tuning data defect appears to have concluded).

At block 512, the return path data adjuster 114 determines whether there are any return path data entries representing set top boxes that transitioned from an off state to an on state before a first time within the suspect time window and transitioned back to the off state at the first time within the suspect time window. In some examples, the suspect time window analyzer 214 determines whether there are any return path data entries representing set top boxes that transitioned from an off state to an on state before a first time within the suspect time window and transitioned back to the off state at the first time within the suspect time window. An example determination by the suspect time window analyzer 214 is discussed with the set top box power plot of FIG. 9B.

If the return path data adjuster 114 and/or the suspect window analyzer 214 determines that there are no return path data entries representing set top boxes that transitioned from an off state to an on state before the first time within the suspect time window and transitioned back to the off state at the first time within the suspect time window, processing continues at block 522. However, if the return path data adjuster 114 and/or the suspect window analyzer 214 determines that there is one or more return path data entries representing set top boxes that transitioned from an off state to an on state before the first time within the suspect time window and transitioned back to the off state at the first time within the suspect time window, processing continues at block 514.

At block 514, the return path data adjuster 114 determines whether any of the return path data entries meeting the preceding criterion indicate the set top boxes did not transition back to the on state after the first time within the discrepancy duration. In some examples, the suspect time window analyzer 214 determines whether any of the return path data entries meeting the preceding criterion indicate the set top boxes did not transition back to the on state after the first time within the discrepancy time period. For example, the suspect time window analyzer 214 can determine that the return path data entries associated with the set top box power plot of FIGS. 9A and 9B did not transition back to the on state after the first time within the discrepancy duration (e.g., 6:00 AM in the example set top box power plots of FIGS. 9A and 9B), as disclosed below.

If the return path data adjuster 114 and/or the suspect window analyzer 214 determines that there are no set top boxes that did not transition back to the on state after the first time within the discrepancy duration, processing continues at block 522. However, if the return path data adjuster 114 and/or the suspect window analyzer 214 determines that there is one or more set top boxes that did not transition back to the on state after the first time within the discrepancy duration, processing continues at block 516.

At block 516, the example return path data adjuster 114 flags return path data entries meeting the preceding criteria as suspect return path data entries. In some examples, the return path data transformer 216 flags (e.g., labels) return path data entries meeting the preceding criteria as suspect data entries.

At block 518, the example return path data adjuster 114 shifts times of the transitions from the off state to the on state for the suspect return path data entries to the first time. In some examples, the return path data transformer 216 shifts times of the transitions from the off state to the on state for the suspect return path data entries to the first time. For example, in the return path data entry associated with the set top box power plot of FIG. 9B, the return path data adjuster 114 shifts the time of the transition from the off state to the on state to 3:00 AM, which is represented by the set top box power plot of corrected return path data of FIG. 9C.

At block 520, the example return path data adjuster 114 assigns the suspect return path data entries a time for a transition from the on state to the off state after the first time and within the discrepancy time window. In some examples, the return path data transformer 216 assigns the suspect return path data entries a time for a transition from the on state to the off state after the first time and within the discrepancy time window based on a model associated with the statistical model generator 208. For example, in the set top box power plot of FIG. 9C, the corrected return path data reflects the return path data transformer 216 being assigned a time for a transition from the on state to the off state after the first time (e.g., 3:00 AM in the set top box power plot of FIG. 9C) and within the discrepancy time window (e.g., prior to 6:00 AM in the set top box power plot of FIG. 9C).

At block 522, the example return path data adjuster 114 determines whether there are any additional suspect time windows to correct. In some examples, the suspect time window identifier 212 determines whether there are any additional suspect time windows to correct. In response to there being additional suspect time windows to correct, processing transfers to block 508. Conversely, in response to there not being any additional suspect time windows to correct, processing transfers to block 524.

At block 524, the example return path data adjuster 114 generates corrected tuning volume data. In some examples, the corrected tuning volume data generator 218 generates corrected tuning volume data. For example, the corrected tuning volume data generator 218 calculates tuning volume quantities based on the corrected return path data. In some examples, after generating corrected tuning volume data, the return path data adjuster 114 determines and/or the corrected tuning volume data generator 218 determines whether the corrected tuning volume data has corrected the possible systematic tuning data defect(s) (block 526). In some examples, in response to the corrected tuning volume data not adequately correcting the possible systematic tuning data defect(s) (bock 526), processing can transfer to block 506 to repeat the procedure to make further corrections to return path data. In some example, if the system tuning data defect(s) has been corrected (block 526), the example program 500 ends.

FIG. 6 is an example first tuning volume plot 600 including raw tuning volume data and tuning volume data based on monitoring data depicting a first type of tuning data defect. The first tuning volume plot 600 includes tuning volume data axis (e.g., the Y-axis) representing a total number of set top boxes (STB) that are turned on plotted against a time axis (e.g., the X-axis). In this example, a time period over several days from on or before August $31^{st}$ to September $1^{st}$ is illustrated.

The example tuning volume plot 600 includes first raw tuning volume data 602 (e.g., tuning volume data based on return path data) and tuning volume data based on first monitoring data 604. In the example first tuning volume plot 600, the first raw tuning volume data 602 and the tuning volume data based on first monitoring data 604 mostly overlap (e.g., are consistent), except during an example first discrepancy duration 622 ($\Delta T_{DISC1}$). The example tuning volume data based on first monitoring data 604 is scaled to make the data comparable to the first raw tuning volume data 602, as the first raw tuning volume data 602 is based on a larger sample size (e.g., numerous set top boxes) compared to the relatively small sample size of the monitoring data (e.g., a group of panelists).

The example tuning volume plot 600 includes an example first suspect time window 606. The first suspect time window 606 corresponds to a time window of the first raw tuning volume data 602 that has been identified as possibly corresponding to a systematic tuning data defect. The first suspect time window 606 begins at 11:21 AM and ends at 11:36 AM. In some examples, the suspect time window identifier 212 identifies suspect time windows (e.g., by executing the machine readable instructions 400 of FIG. 4). The example suspect time window includes an example first maximum tuning volume value 608 ($TV_{max1}$), corresponding to the maximum tuning volume value in the first raw tuning volume data 602 in the time frame of the first suspect time window 606, and an example first minimum tuning volume value 610 (TV$_{min1}$) at approximately 11:26 AM, corresponding to the minimum tuning volume value in the first raw tuning volume data 602 in the time frame of the first suspect time window 606. The example first maximum change value 612 (ΔTV$_1$) represents a difference between the first maximum tuning volume value 608 and the first minimum tuning volume value 610.

The example first suspect time window 606 further includes a first expected maximum tuning volume value 614 (TV$_{emax1}$), corresponding to the maximum tuning volume value in the tuning volume data based on first monitoring data 604 during the first suspect time window 606, and an example expected minimum tuning volume value 616 (TV$_{emin1}$), corresponding to the minimum tuning volume value in the tuning volume data based on first monitoring data 604. An example first expected maximum change value 618 (ΔTV$_{e1}$) represents a difference between the first expected maximum tuning volume value 614 and the expected minimum tuning volume value 616. In some examples, in response to a difference the first maximum change value 612 exceeding a suspect threshold relative to the first expected maximum change value 618, the first suspect time window 606 is labeled as a suspect time window (e.g., as in blocks 410-412 of the machine readable instructions 400 of FIG. 4).

The example first tuning volume plot 600 includes an example first time 620, at approximately 11:21 AM, associated with the start of a possible systematic tuning data defect. In some examples, the first time 620 is the starting time of the first suspect time window identified. After the first time 620 is the first discrepancy duration ΔT$_{DISC1}$ 622, corresponding to the amount of time for which the first raw tuning volume data 602 differs from the tuning volume data based on first monitoring data 604 more than a discrepancy threshold (e.g., as determined in block 310 of the machine readable instructions 300 of FIG. 3). In the first tuning volume plot 600, the first discrepancy duration 622 extends from the first time 620 to 3:24 PM.

Figure 7A:
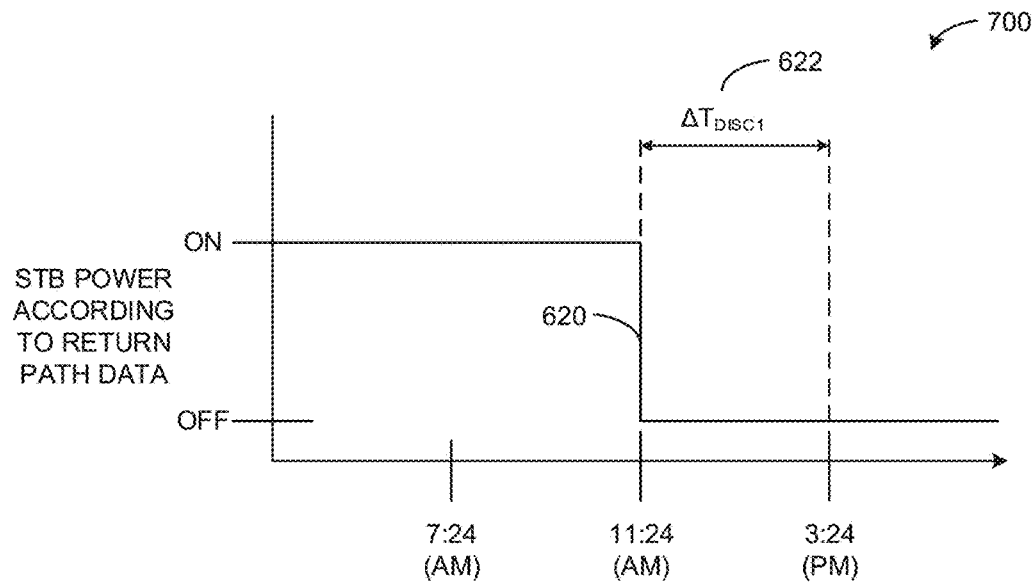
FIG. 7A is an example first set top box power plot based on return path data for a set top box included in the first tuning volume plot of FIG. 6.
Figure 7B:
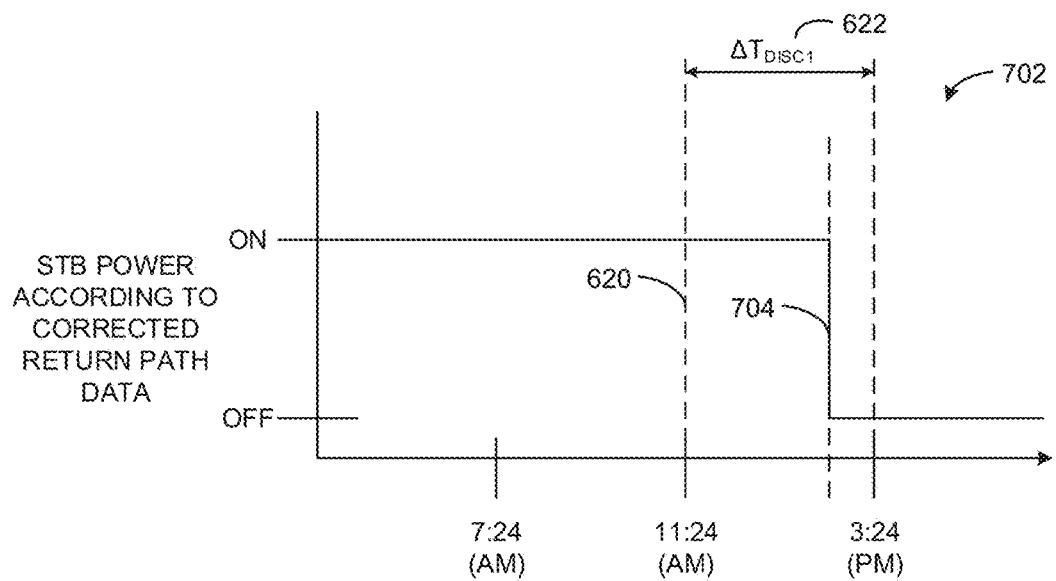
FIG. 7B is an example second set top box power plot based on corrected return path data for the set top box corresponding to the first set top box power plot of FIG. 7A.

FIG. 7A is an example first set top box power plot 700 based on return path data for a set top box included in the first tuning volume plot of FIG. 6. The first set top box power plot 700 depicts a return path data entry indicating a power status (e.g., whether the set top box was in the on state or the off state) on the vertical axis (e.g., the Y-axis) and time values on the horizontal axis (e.g., the X-axis) for one set top box of the set top boxes represented by the first tuning volume plot of FIG. 6. The first set top box power plot 700 depicts the set top box experiencing a transition from the on state to the off state at the first time 620, and remaining in the off state throughout the first discrepancy duration 622 (e.g., until at least 3:24 PM). In some examples, the return path data adjuster 114 determines the return path data entry depicted in the first set top box power plot 700 as a suspect return path data entry (e.g., as per the instructions of blocks 312-316 of the machine readable instructions 300 of FIG. 3). In some examples, after identifying the return path data entry depicted in the first set top box power plot 700 as a suspect return path data entry, steps may be taken to modify the return path data entry to correct the possible systematic tuning data defect.

FIG. 7B is an example second set top box power plot 702 based on corrected return path data for the set top box corresponding to the first set top box power plot 700 of FIG. 7A. The second set top box power plot 702 depicts the set top box remaining on at the first time 620, and transition from the on state to the off state at an example assigned time 704 within the first discrepancy duration 622. In some examples, the assigned time 704 is determined based on a probability distribution. In some examples, the return path data entry of the first set top box power plot 700 of FIG. 7A is corrected by the return path data adjuster 114 per the instructions of blocks 318-320 of the machine readable instructions 300 of FIG. 3, resulting in the corrected return path data depicted in the second set top box power plot 702 of FIG. 7B.

FIG. 8 is an example second tuning volume plot 800 including example second raw tuning volume data 802 and example second tuning volume data based on monitoring data 804 depicting a second type of tuning data defect. The second tuning volume plot 800 includes an example second suspect time window 806, which can be analyzed by the return path data adjuster 114. The second suspect time window 806 includes an example second maximum tuning volume value 808 (TV$_{max2}$), an example second minimum tuning volume value 810 (TV$_{min2}$), an example second maximum change value 812 (ΔTV$_2$), an example second expected maximum tuning volume value 814 (TV$_{emax2}$), an example second expected minimum tuning volume value 816 (TV$_{emin2}$), and an example second expected maximum change value 818 (ΔTV$_{e2}$), which are similar to the corresponding elements in the first tuning volume plot 600 (e.g., the second maximum tuning volume value 808 is similar to the first maximum tuning volume value 608, the second minimum tuning volume value 810 is similar to the first minimum tuning volume value 610, etc.), except for representing different data. The second tuning volume plot 800 also includes an example second time 820, associated with a start time of the suspect time window and/or a start time of the possible systematic tuning data defect. Following the second time 820 is an example second discrepancy time period 822 (ΔT$_{DISC2}$), corresponding to a duration of the possible systematic tuning data defect.

The second tuning volume plot 800 depicts a second type of possible systematic tuning data defect. In the second suspect time window 806, there is a noticeable sharp increase in tuning volume followed by a sharp decrease in tuning volume, according to the second raw tuning volume data 802. Unlike the first tuning volume plot 600 of FIG. 6, the second tuning volume plot depicts a sharp increase in tuning volume prior to the sharp decrease. However, despite being different behaviors, techniques disclosed herein enable identification of the suspect time window (and subsequently identification of the possible systematic tuning data defect). In the second suspect time window 806, the sharp increase and sharp decrease in tuning volume results in the second maximum change value 812 being very large relative to the second expected maximum change value 818, leading to identification of the second suspect time window 806 (e.g., via techniques described in association with the machine readable instructions 400 of FIG. 4).

In some examples, the second type of suspect tuning data defect depicted in the second suspect time window 806 is associated with two different set top box behaviors. For example, a first group of set top boxes in the return path data represented in the tuning volume plot 800 report turning on (e.g., slightly before 3:00 AM in the second tuning volume plot 800 of FIG. 8), performing an update operation and/or a data transmission operation (e.g., transmitting return path data to a provider and/or AME), and turning off (e.g., at approximately 3:00 AM in the second tuning volume plot 800 of FIG. 8). In such examples, there is a sharp increase in tuning volume due to the first group of set top boxes turning on to perform the update operation and/or the transmission operation, followed by a sharp decrease when these first group of set top boxes turn off. The sharp decrease in tuning volume can be further amplified by a second group of set top boxes exhibiting a second behavior. The second group of set top boxes report being already on at the second time 820 and report transitioning from the on state to the off state after performing the update operation and/or the data transmission operation. In some examples, the first group of set top boxes is associated with set top boxes that were not in use (e.g., not in an on state) and only were briefly in the on state to perform a function (e.g., an update, a transmission, etc.). The second group of set top boxes may perform the same function at a same time (e.g., around 3:00 AM) but the second group of set top boxes were already in the on state, and thus only transition from the on state to the off state.

In some examples, to correct the second type of suspect tuning data defect depicted in the second suspect time window 806, return path data associated with set top boxes that turned on and then off within the second suspect time window 806, and did not turn on within the second discrepancy time period 822 (e.g. as in the first group of set top boxes previously described), is modified to indicate these set top boxes remaining on at the second time 820 until these set top boxes turn off at an assigned time determined based on a probability distribution (e.g., as described in blocks 512-520 of the machine readable instructions of FIG. 5). In other examples, the second type of suspect tuning data defect can be corrected by eliminating the transition from the on state to the off state in return path data associated with set top boxes exhibiting the behavior of the previously described first group of set top boxes. In some examples, the second type of suspect tuning data defect can be corrected by eliminating the transition from the on state to the off state in return path data corresponding to the previously described second group of set top boxes, and assigning return path data entries corresponding to the second group of set top boxes a new time to transition from the on state to the off state that is within the second discrepancy time period 822.

Figure 9A:
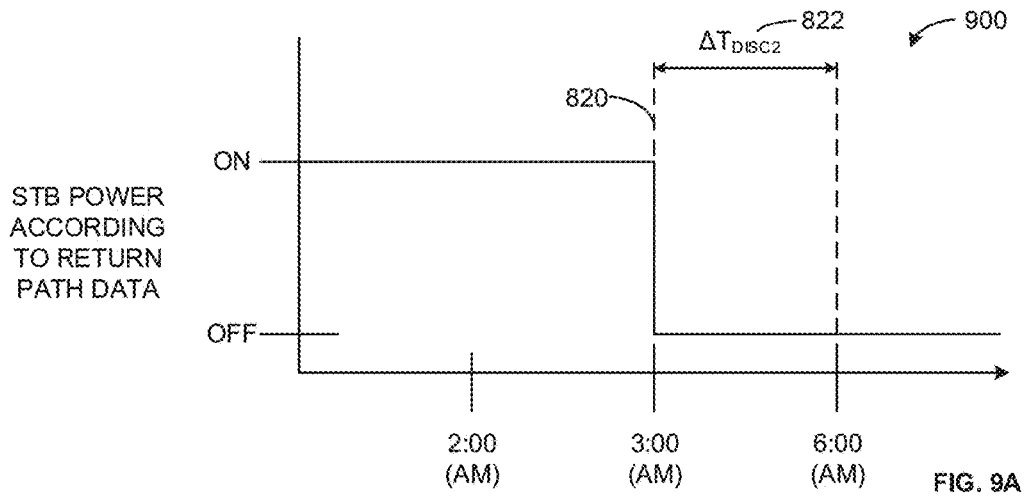
FIG. 9A is an example third set top box power plot based on return path data for a first set top box included in the second tuning volume plot of FIG. 8.

FIG. 9A is an example third set top box power plot 900 based on return path data for a first set top box included in the second tuning volume plot 800 of FIG. 8. The third set top box power plot 900 depicts a set top box that transitions from the on state to the off state at the second time 820, and remains in the off state throughout the second discrepancy time period 822.

Figure 9B:
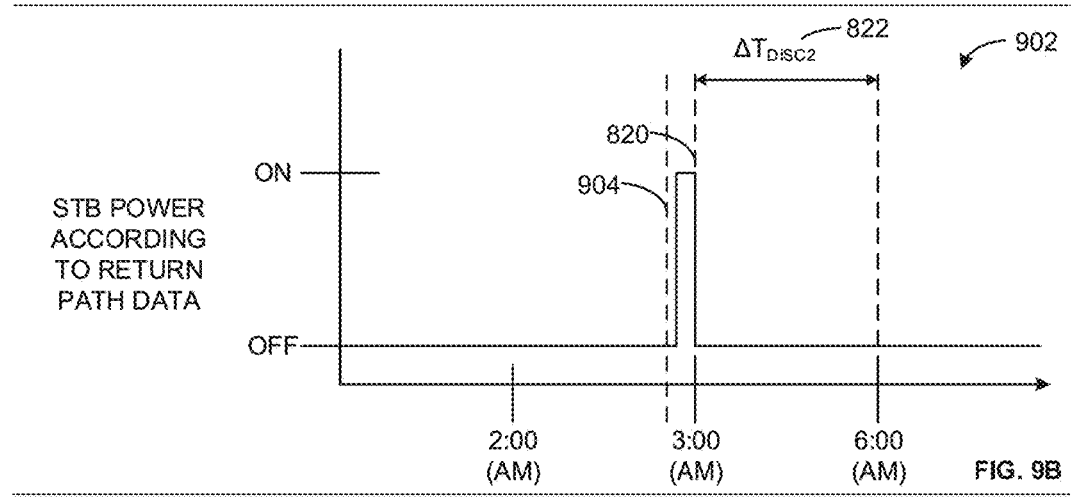
FIG. 9B is an example fourth set top box power plot based on return path data for a second set top box included in the second tuning volume plot of FIG. 8.
Figure 9C:
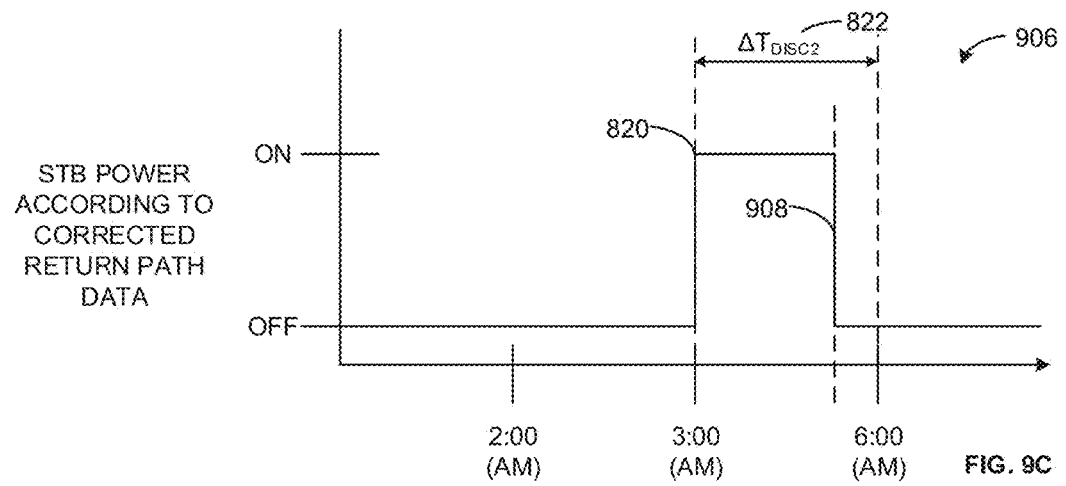
FIG. 9C is an example fifth set top box power plot based on corrected return path data for the second set top box corresponding to the fourth set top box power plot of FIG. 9B.

FIG. 9B is an example fourth set top box power plot 902 based on return path data for a second set top box included in the second tuning volume plot 800 of FIG. 8. The fourth set top box power plot 902 represents a set top box that transitions from the off state to the on state within the suspect time window and transitions from the on state to the off state at the second time 820 within the suspect time window. The fourth set top box power plot 902 includes an example second suspect time window boundary 904, depicting the starting time of the second suspect time window 806. The set top box associated with the data of the fourth set top box power plot 902 may have turned on to perform an update operation and/or a transmission operation and then turned off.

FIG. 9C is an example fifth set top box power plot 906 based on corrected return path data for the set top box corresponding to the fourth set top box power plot 902 of FIG. 9B. The fifth set top box power plot 906 illustrates the transition from the off state to the on state being moved to the second time 820. In some examples, this shift of the transition from the off state to the on state to the second time 820 helps offset (e.g., cancel out) return path data for set top boxes corresponding to the behavior of the third set top box power plot 900 of FIG. 9A. The fifth set top box power plot 906 further includes an example second assigned time 908, within the second discrepancy time period 822, for the set top box to transition from the on state to the off state. By performing similar operations on other suspect return path data entries represented in the second tuning volume plot 800 of FIG. 8, the second type of systematic tuning error can be corrected.

Figure 10:
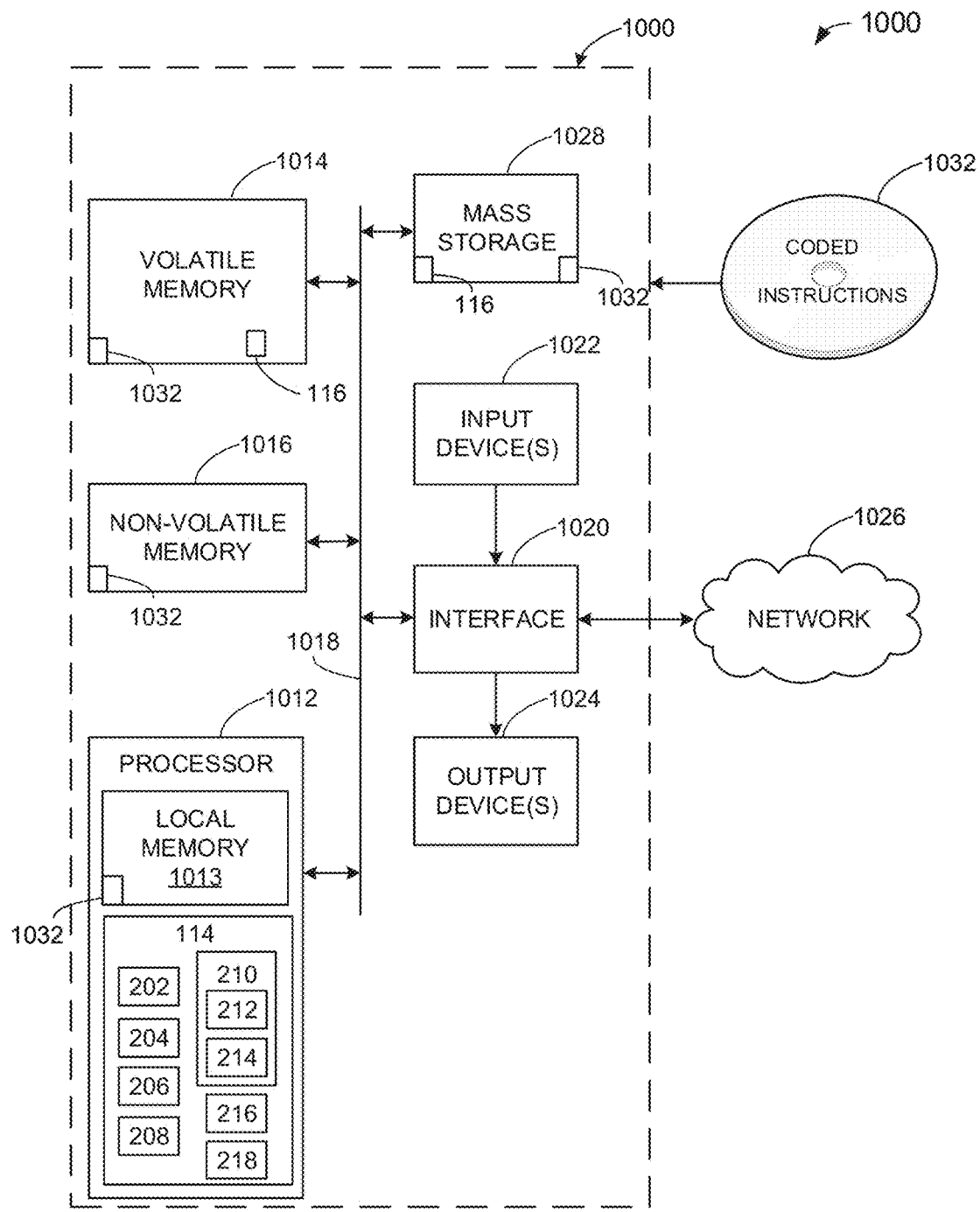
FIG. 10 is a block diagram of an example processing platform structured to execute the instructions of FIGS. 3-5 to implement the return path data adjuster of FIGS. 1 and 2.

FIG. 10 is a block diagram of an example processor platform 1000 structured to execute the instructions of FIGS. 3-5 to implement the return path data adjuster 114 of FIG. 2. The processor platform 1000 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example return path data manager 202, the example raw tuning volume data generator 204, the example monitoring data manager 206, the example statistical model generator 208, the example defect analyzer 210, the example suspect time window identifier 212, the example suspect time window analyzer 214, the example return path data transformer 216, the example corrected tuning volume data generator 218 and/or, more generally, the example return path data adjuster 114.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 3-5 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that enable the correction of systematic tuning data defects in tuning data from return path data. The techniques disclosed herein correct errors caused by set top boxes that have encountered unusual behavior (e.g., a restart operation, a transmission operation, an update operation, a power outage, etc.). Techniques disclosed can advantageously (1) identify errors based on comparison of tuning volume data based on return path data and tuning volume data based on monitoring data, (2) correct errors in return path data entries, and (3) generate corrected tuning volume data representing aggregate tuning data based on return path data.

The techniques disclosed herein advantageously utilize return path data, which can be obtained directly from a set top box and thus have large sample sizes, along with highly accurate monitoring data to address possible tuning data defects, to generate reliable tuning volume data. The disclosed methods, apparatus and articles of manufacture improve the efficiency of using a computing device by enabling readily-available return path data from set top boxes to be used to generate reliable tuning volume data, as opposed to relying on smaller sample monitoring data that requires substantially more effort to acquire. The disclosed methods, apparatus and articles of manufacture are accordingly directed to one or more improvement(s) in the functioning of a computer.

An example apparatus includes a tuning data defect correction apparatus including a defect analyzer to identify a suspect time window in tuning volume data of return path data reported by set top boxes, and a return path data transformer to identify a first return path data entry indicating a first set top box reported a first transition to an off state at a first time during the suspect time window, and modify the first return path data entry to (1) eliminate the first transition to the off state at the first time and (2) assign the first return path data entry a first duration to remain in an on state after the first time, the first duration determined based on monitoring data reported from media device meters monitoring media presentation devices.

In some examples, the apparatus further includes a suspect time window analyzer to determine a discrepancy duration based on a comparison of the tuning volume data and the monitoring data.

In some examples, the first duration is assigned as a time value between the first time and an end time of the discrepancy duration.

In some examples, the return path data transformer is to identify the first return path data entry when the first return path data entry indicates (1) the first set top box reported the first transition to the off state at the first time during the suspect time window and (2) the first set top box reported a second transition from the off state to the on state within the suspect time window, the second transition prior to the first transition.

In some examples, the return path data transformer is to identify the first return path data entry when the first return path data entry indicates (1) the first set top box reported the first transition to the off state at the first time during the suspect time window, (2) the first set top box reported the second transition from the off state to the on state within the suspect time window, the second transition prior to the first transition, and (3) the first set top box did not experience a third transition from the off state to the on state after the first time and before the discrepancy duration.

In some examples, the return path data transformer is to identify the first return path data entry when the first return path data entry indicates (1) the first set top box reported the first transition to the off state at the first time during the suspect time window and (2) the first set top box did not experience a second transition from the off state to the on state within the discrepancy duration.

In some examples, the apparatus further includes a corrected tuning volume data generator to, in response to the return path data transformer modifying the first return path data entry and modifying a second return path data entry, generate corrected tuning volume data, the corrected tuning volume data being an aggregation of tuning data based the first return path data entry and the second return path data entry.

Also disclosed herein is an example non-transitory computer readable storage medium that includes computer readable instructions that, when executed, cause a processor to at least identify a suspect time window in tuning volume data of return path data reported by set top boxes, identify a first return path data entry indicating a first set top box reported a first transition to an off state at a first time during the suspect time window, and modify the first return path data entry to (1) eliminate the first transition to the off state at the first time and (2) assign the first return path data entry a first duration to remain in an on state after the first time, where the first duration is determined based on monitoring data reported from media device meters monitoring media presentation devices.

In some examples, the computer readable instructions, when executed, cause the processor to determine a discrepancy duration based on a comparison of the tuning volume data and the monitoring data.

In some examples, the computer readable instructions, when executed, cause the processor to determine the first duration as a time value between the first time and an end time of the discrepancy duration.

In some examples, the computer readable instructions cause the processor to identify the first return path data entry when the first return path data entry indicates (1) the first set top box reported the first transition to the off state at the first time during the suspect time window and (2) the first set top box reported a second transition from the off state to the on state within the suspect time window, the second transition prior to the first transition.

In some examples, the computer readable instructions cause the processor to identify the first return path data entry when the first return path data entry indicates (1) the first set top box reported the first transition to the off state at the first time during the suspect time window, (2) the first set top box reported the second transition from the off state to the on state within the suspect time window, the second transition prior to the first transition, and (3) the first set top box did not experience a third transition from the off state to the on state after the first time and before the discrepancy duration.

In some examples, the computer readable instructions cause the processor to identify the first return path data entry when the first return path data entry indicates (1) the first set top box reported the first transition to the off state at the first time during the suspect time window and (2) the first set top box did not experience a second transition from the off state to the on state within the discrepancy duration.

In some examples, the computer readable instructions cause the processor to, in response to modifying the first return path data entry and modifying a second return path data entry, generate corrected tuning volume data, the corrected tuning volume data being an aggregation of tuning data based on the first return path data entry and the second return path data entry.

An example method to correct tuning data defects includes identifying a suspect time window in tuning volume data of return path data reported by set top boxes, identifying a first return path data entry indicating a first set top box reported a first transition to an off state at a first time during the suspect time window, and modifying the first return path data entry to (1) eliminate the first transition to the off state at the first time and (2) assign the first return path data entry a first duration to remain in an on state after the first time, where the first duration is determined based on monitoring data reported from media device meters monitoring media presentation devices.

In some examples, the method further includes determining a discrepancy duration based on a comparison of the tuning volume data and the monitoring data.

In some examples, the method further includes determining the first duration as a time value between the first time and an end time of the discrepancy duration.

In some examples, the method further includes identifying the first return path data entry when the first return path data entry indicates (1) the first set top box reported the first transition to the off state at the first time during the suspect time window and (2) the first set top box reported a second transition from the off state to the on state within the suspect time window, the second transition prior to the first transition.

In some examples, the method further includes identifying the first return path data entry when the first return path data entry indicates (1) the first set top box reported the first transition to the off state at the first time during the suspect time window, (2) the first set top box reported the second transition from the off state to the on state within the suspect time window, the second transition prior to the first transition, and (3) the first set top box did not experience a third transition from the off state to the on state after the first time and before the discrepancy duration.

In some examples, the method includes identifying the first return path data entry when the first return path data entry indicates (1) the first set top box reported the first transition to the off state at the first time during the suspect time window and (2) the first set top box did not experience a second transition from the off state to the on state within the discrepancy duration.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A tuning data defect correction apparatus comprising:
   a defect analyzer to identify a suspect time window in tuning volume data of return path data reported by set top boxes; and
   a return path data transformer to:
      identify a first return path data entry indicating a first set top box reported a first transition to an off state at a first time during the suspect time window; and
      modify the first return path data entry to (1) eliminate the first transition to the off state at the first time and (2) assign the first return path data entry a first duration to remain in an on state after the first time, the first duration determined based on monitoring data reported from media device meters monitoring media presentation devices.

2. The apparatus of claim 1, further including a suspect time window analyzer to determine a discrepancy duration based on a comparison of the tuning volume data and the monitoring data.

3. The apparatus of claim 2, wherein the first duration is assigned as a time value between the first time and an end time of the discrepancy duration.

4. The apparatus of claim 2, wherein the return path data transformer is to identify the first return path data entry when the first return path data entry indicates (1) the first set top box reported the first transition to the off state at the first time during the suspect time window and (2) the first set top box reported a second transition from the off state to the on state within the suspect time window, the second transition prior to the first transition.

5. The apparatus of claim 4, wherein the return path data transformer is to identify the first return path data entry when the first return path data entry indicates (1) the first set top box reported the first transition to the off state at the first time during the suspect time window, (2) the first set top box reported the second transition from the off state to the on state within the suspect time window, the second transition prior to the first transition, and (3) the first set top box did not experience a third transition from the off state to the on state after the first time and before the discrepancy duration.

6. The apparatus of claim 2, wherein the return path data transformer is to identify the first return path data entry when the first return path data entry indicates (1) the first set top box reported the first transition to the off state at the first time during the suspect time window and (2) the first set top box did not experience a second transition from the off state to the on state within the discrepancy duration.

7. The apparatus of claim 1, further including a corrected tuning volume data generator to, in response to the return path data transformer modifying the first return path data entry and modifying a second return path data entry, generate corrected tuning volume data, the corrected tuning volume data being an aggregation of tuning data based on the first return path data entry and the second return path data entry.

8. A non-transitory computer readable storage medium comprising computer readable instructions that, when executed, cause a processor to at least:
   identify a suspect time window in tuning volume data of return path data reported by set top boxes;
   identify a first return path data entry indicating a first set top box reported a first transition to an off state at a first time during the suspect time window; and
   modify the first return path data entry to (1) eliminate the first transition to the off state at the first time and (2) assign the first return path data entry a first duration to remain in an on state after the first time, the first duration determined based on monitoring data reported from media device meters monitoring media presentation devices.

9. The non-transitory computer readable storage medium of claim 8, wherein the computer readable instructions, when executed, cause the processor to determine a discrepancy duration based on a comparison of the tuning volume data and the monitoring data.

10. The non-transitory computer readable storage medium of claim 9, wherein the computer readable instructions, when executed, cause the processor to determine the first duration as a time value between the first time and an end time of the discrepancy duration.

11. The non-transitory computer readable storage medium of claim 9, wherein the computer readable instructions cause the processor to identify the first return path data entry when the first return path data entry indicates (1) the first set top box reported the first transition to the off state at the first time during the suspect time window and (2) the first set top box reported a second transition from the off state to the on state within the suspect time window, the second transition prior to the first transition.

12. The non-transitory computer readable storage medium of claim 11, wherein the computer readable instructions cause the processor to identify the first return path data entry when the first return path data entry indicates (1) the first set top box reported the first transition to the off state at the first time during the suspect time window, (2) the first set top box reported the second transition from the off state to the on state within the suspect time window, the second transition prior to the first transition, and (3) the first set top box did not experience a third transition from the off state to the on state after the first time and before the discrepancy duration.

13. The non-transitory computer readable storage medium of claim 9, wherein the computer readable instructions cause the processor to identify the first return path data entry when the first return path data entry indicates (1) the first set top box reported the first transition to the off state at the first time during the suspect time window and (2) the first set top box did not experience a second transition from the off state to the on state within the discrepancy duration.

14. The non-transitory computer readable storage medium of claim 8, wherein the computer readable instructions cause the processor to, in response to modifying the first return path data entry and modifying a second return path data entry, generate corrected tuning volume data, the corrected tuning volume data being an aggregation of tuning data based on the first return path data entry and the second return path data entry.

15. A method to correct tuning data defects comprising:
   identifying a suspect time window in tuning volume data of return path data reported by set top boxes;
   identifying a first return path data entry indicating a first set top box reported a first transition to an off state at a first time during the suspect time window; and
   modifying the first return path data entry to (1) eliminate the first transition to the off state at the first time and (2) assign the first return path data entry a first duration to remain in an on state after the first time, the first duration determined based on monitoring data reported from media device meters monitoring media presentation devices.

16. The method of claim 15, further including determining a discrepancy duration based on a comparison of the tuning volume data and the monitoring data.

17. The method of claim 16, further including determining the first duration as a time value between the first time and an end time of the discrepancy duration.

18. The method of claim 16, including identifying the first return path data entry when the first return path data entry indicates (1) the first set top box reported the first transition to the off state at the first time during the suspect time window and (2) the first set top box reported a second transition from the off state to the on state within the suspect time window, the second transition prior to the first transition.

19. The method of claim 18, including identifying the first return path data entry when the first return path data entry indicates (1) the first set top box reported the first transition to the off state at the first time during the suspect time window, (2) the first set top box reported the second transition from the off state to the on state within the suspect time window, the second transition prior to the first transition, and (3) the first set top box did not experience a third transition from the off state to the on state after the first time and before the discrepancy duration.

20. The method of claim 16, including identifying the first return path data entry when the first return path data entry indicates (1) the first set top box reported the first transition to the off state at the first time during the suspect time window and (2) the first set top box did not experience a second transition from the off state to the on state within the discrepancy duration.

\* \* \* \* \*